(12) United States Patent
Jungeberg

(10) Patent No.: US 10,012,261 B2
(45) Date of Patent: *Jul. 3, 2018

(54) METHOD AND APPARATUS FOR RELEASABLY IMMOBILIZING AN ATTACHMENT TO AN EXTERNAL OBJECT

(71) Applicant: Kenneth Alvin Jungeberg, Liberty Township, OH (US)

(72) Inventor: Kenneth Alvin Jungeberg, Liberty Township, OH (US)

( * ) Notice: Subject to any disclaimer, the term of this patent is extended or adjusted under 35 U.S.C. 154(b) by 437 days.

This patent is subject to a terminal disclaimer.

(21) Appl. No.: 14/810,253

(22) Filed: Jul. 27, 2015

(65) Prior Publication Data

US 2015/0345547 A1    Dec. 3, 2015

Related U.S. Application Data

(63) Continuation-in-part of application No. 13/625,915, filed on Sep. 25, 2012, now Pat. No. 9,157,471, and a continuation-in-part of application No. 13/669,236, filed on Nov. 5, 2012, now Pat. No. 9,093,053.

(60) Provisional application No. 61/539,032, filed on Sep. 26, 2011, provisional application No. 61/555,295, filed on Nov. 3, 2011.

(51) Int. Cl.
  *F16C 11/06* (2006.01)
  *F16C 11/10* (2006.01)
  *F16C 43/02* (2006.01)

(52) U.S. Cl.
  CPC ...... *F16C 11/0695* (2013.01); *F16C 11/0604* (2013.01); *F16C 11/0614* (2013.01); *F16C 11/0685* (2013.01); *F16C 11/106* (2013.01); *F16C 43/02* (2013.01); *Y10T 29/49647* (2015.01); *Y10T 29/49666* (2015.01)

(58) Field of Classification Search
  CPC combination set(s) only.
  See application file for complete search history.

(56) References Cited

U.S. PATENT DOCUMENTS

| | | |
|---|---|---|
| 1,590,204 A | 6/1926 | Powell |
| 2,404,385 A | 7/1946 | Fritts |
| 2,711,352 A | 6/1955 | Hasko et al. |
| 2,785,022 A | 3/1957 | Lakey et al. |
| 3,539,208 A | 10/1970 | Brooklyn et al. |
| 3,539,234 A | 11/1970 | Rapata |
| 3,550,636 A | 12/1970 | Hearne et al. |
| 3,768,879 A | 10/1973 | Dee |
| 3,776,649 A | 12/1973 | Kemezys |
| 3,960,416 A | 6/1976 | McCloskey |

(Continued)

OTHER PUBLICATIONS

Ellis, Matthew, Stay Put Pedal Keeper Website (visited Aug. 16, 2015)<http://www.mktadvisory.com/ellis/>.

*Primary Examiner* — Daniel J Wiley
(74) *Attorney, Agent, or Firm* — John B. Woodard; Jon L. Woodard; Woodard International Law

(57) ABSTRACT

A spherical bearing for releasably immobilizing an attachment to a shaft or other external object is provided. The spherical bearing comprises a truncated flexible spherical core with an annular hole through the center of the spherical core for appending the core on the shaft or external object. Segments around the spherical core are created by relief cuts in the spherical core, and deflection flexure points displaced from the annular hole are formed by the relief cuts in the core. A housing provides compression against the core and immobilization of the shaft or other external object.

87 Claims, 18 Drawing Sheets

(56) References Cited

U.S. PATENT DOCUMENTS

| | | | |
|---|---|---|---|
| 4,025,214 A | 5/1977 | Spieth | |
| 4,105,261 A | 8/1978 | Myers et al. | |
| 4,248,486 A | 2/1981 | Bradley, Jr. | |
| 4,357,651 A | 11/1982 | Mayer | |
| 4,673,376 A | 6/1987 | Fender | |
| 4,753,462 A | 6/1988 | Liu | |
| 4,856,406 A | 8/1989 | Ohmuro | |
| 4,980,805 A | 12/1990 | Maglica et al. | |
| 5,184,884 A | 2/1993 | Maglica et al. | |
| 5,270,911 A | 12/1993 | Maglica et al. | |
| 5,351,980 A | 10/1994 | Huang | |
| 5,515,246 A | 5/1996 | Maglica | |
| 5,660,363 A | 8/1997 | Maglica | |
| 5,667,185 A | 9/1997 | Maglica | |
| 5,842,385 A | 12/1998 | Su | |
| 5,860,728 A | 1/1999 | Maglica | |
| 5,990,401 A | 11/1999 | Braun | |
| 6,075,192 A | 6/2000 | Hoshino | |
| 6,166,312 A | 12/2000 | Brewster | |
| 6,167,780 B1 | 1/2001 | Chen | |
| 6,186,027 B1 | 2/2001 | Nielsen | |
| 6,188,007 B1 | 2/2001 | Liao | |
| 6,325,544 B1 | 12/2001 | Sasaki et al. | |
| 6,331,666 B1 | 12/2001 | Chang | |
| 6,368,321 B1 | 4/2002 | Jackson | |
| 6,528,714 B1 | 3/2003 | Liao | |
| 6,632,990 B2 | 10/2003 | Menzel et al. | |
| 6,742,750 B2 | 6/2004 | Burr | |
| 6,860,638 B2 | 3/2005 | Fish | |
| 6,913,410 B2 | 7/2005 | Blanke | |
| 6,982,374 B2 | 1/2006 | Hsieh | |
| 6,988,696 B2 | 1/2006 | Attee | |
| 7,037,022 B2 | 5/2006 | Schonhoff et al. | |
| 7,135,633 B2 | 11/2006 | Miyajima et al. | |
| 7,246,781 B2 | 7/2007 | Nam | |
| 7,300,210 B2 | 11/2007 | Johnson et al. | |
| 7,629,525 B1 | 12/2009 | Lin | |
| 7,696,422 B1 | 4/2010 | Chang | |
| 7,699,332 B2 | 4/2010 | Lai | |
| 8,212,133 B2 | 4/2012 | Chen | |
| 2002/0037117 A1 | 3/2002 | Sasaki et al. | |
| 2002/0097932 A1 | 7/2002 | Roberts et al. | |
| 2005/0036722 A1 | 2/2005 | Sato et al. | |
| 2005/0109192 A1 | 5/2005 | Miyajima et al. | |
| 2009/0096185 A1 | 4/2009 | Wu et al. | |
| 2010/0005948 A1 | 1/2010 | Romolino | |
| 2010/0043592 A1 | 2/2010 | Johansson | |
| 2010/0125302 A1 | 5/2010 | Hammill et al. | |
| 2011/0035866 A1 | 2/2011 | Ricca | |
| 2012/0291610 A1 | 11/2012 | Sassmannshausen et al. | |
| 2013/0077904 A1 | 3/2013 | Jungeberg | |
| 2013/0112059 A1 | 5/2013 | Jungeberg et al. | |

METHOD AND APPARATUS FOR RELEASABLY IMMOBILIZING AN ATTACHMENT TO AN EXTERNAL OBJECT

CROSS REFERENCE TO RELATED APPLICATIONS

This application is a divisional and continuation-in-part application of co-pending U.S. patent application Ser. No. 13/625,915, filed Sep. 25, 2012, which claims the benefit of U.S. Provisional Patent Application No. 61/539,032, filed Sep. 26, 2011. This application is also a continuation-in-part of co-pending U.S. patent application Ser. No. 13/669,236, filed Nov. 5, 2012, which takes priority from U.S. Provisional Patent Application No. 61/555,295, filed Nov. 3, 2011. The contents of all of application Ser. Nos. 13/625,915, 61/539,032, 13/669,236, and 61/555,295 are incorporated herein by reference.

BACKGROUND

When working with a mechanical apparatus, it is often desirable to connect an element of the apparatus or the entire apparatus to an external object such as a shaft. The connected object or shaft can arise from nearly any source and range from a free standing or floating shaft to a securely positioned shaft or other object specifically designed for mounting an apparatus. A shaft can even be an element of another apparatus.

Depending on the mechanical situation, it is often desirable not only to make a connection to a shaft but to lock whatever is connected to the shaft in a particular orientation with respect to the shaft at least temporarily. Subsequently, it can become desirable to change the orientation of the connected or mounted element. To do this various kinds of locking devices have been provided in the past which can be locked in place and released for adjustment.

In general the state of the art for rotating and then locking a device at any point along a shaft is to use three separate mechanisms: one that allows translation along and rotation about the shaft, and two others that allow rotation about two mutually perpendicular axes that are themselves perpendicular to the axis of the shaft.

The complexity and size of an assembly of mechanisms to do this, along with the inefficiency of having to orient and then lock three mechanisms to achieve a particular position or orientation is cumbersome at best and can be frustrating for the operator as the operator attempts to align a connection in a three dimensional space. A single mechanism that concurrently allows rotation about all three axes and translation along the axis of the shaft in a single motion and is then fixed in place by a single locking motion is sometimes used.

Commonly, such a solution would use a spherical alignment bearing or joint with the bearing housing and the spherical core both split and would incorporate a clamping mechanism on the housing to tighten the housing on the core and consequently the core on the shaft. However, to achieve maximum clamping pressure of the bearing on the shaft, the split in the housing and the split in the core need to be aligned in substantially the same plane.

This again makes such a system difficult to use causing frustration by the user and unreliable clamping with variable clamping forces needed depending on how the core is aligned with the clamp. A better method is needed for clamping releasably, reliably and adjustably while aligning and maintaining alignment of the apparatus that is being clamped and positioned together without the need to focus on alignment of the elements comprising the core and clamping mechanism.

BRIEF DESCRIPTION OF THE INVENTION

A spherical bearing for releasably immobilizing an attachment to a shaft or other external object is provided. The spherical bearing comprises a truncated flexible spherical core with an annular hole through the center of the spherical core for appending the core on the shaft or external object. Segments around the spherical core are created by relief cuts in the spherical core, and deflection flexure points displaced from the annular hole are formed by the relief cuts in the core.

A housing surrounds the spherical core. The housing is designed to compress the core when a releasable clamping mechanism is applied to the housing. The clamping mechanism causes the segments of the core to deflect about the deflection flexure points toward the shaft immobilizing the core on the shaft and immobilizing the housing on the core. The spherical core generally has a spherical core diameter and the shaft or external object generally has a shaft or object diameter wherein the ratio of the spherical core diameter to shaft/object diameter is greater than about 1.5.

A method for releasably immobilizing an attachment to a shaft is provided. The method comprises providing a spherical core for a spherical bearing and boring an annular hole through the center of the core. Segments are created around the spherical core by making relief cuts in the core and arranging the relief cuts to provide deflection flexure points displaced from the annular hole.

A housing is provided that surrounds the spherical core and comprises a clamping mechanism for compressing the spherical core. An attachment is appended to the housing, and the shaft is disposed in the annular hole. The housing and the spherical core are compressed using the clamping mechanism. The clamping pressure deflects the segments about the deflection flexure points toward the shaft immobilizing the core on the shaft, the housing on the core and the attachment on the housing. Releasing the clamping mechanism releases the immobilization of the attachment when mobility of the attachment is desired.

In some contemplated embodiments, a two-piece housing is provided that is compressed around the spherical core with a strap clamp having a tightening mechanism. Such embodiments allow for enhanced hoop compression of the sphere for immobilization of an immobilized object such as a shaft.

DETAILED DESCRIPTION OF THE INVENTION

A spherical bearing, sometimes called a spherical joint, is provided that permits not only ease of alignment but also easily maintained alignment when releasably immobilizing an attachment to a shaft. The joint comprises a spherical inner core which is surrounded by a housing around the core. The joint apparatus does not require careful alignment of the housing and core to efficiently perform its function. To overcome the problem of maintaining alignment and/or immobilization of the item attached to the bearing, the spherical inner core is modified with a series of structural modifications called relief cuts to assure maximum immobility when the bearing or joint is clamped on the shaft regardless of the orientation of the core relative to the clamp housing.

Figure 1:
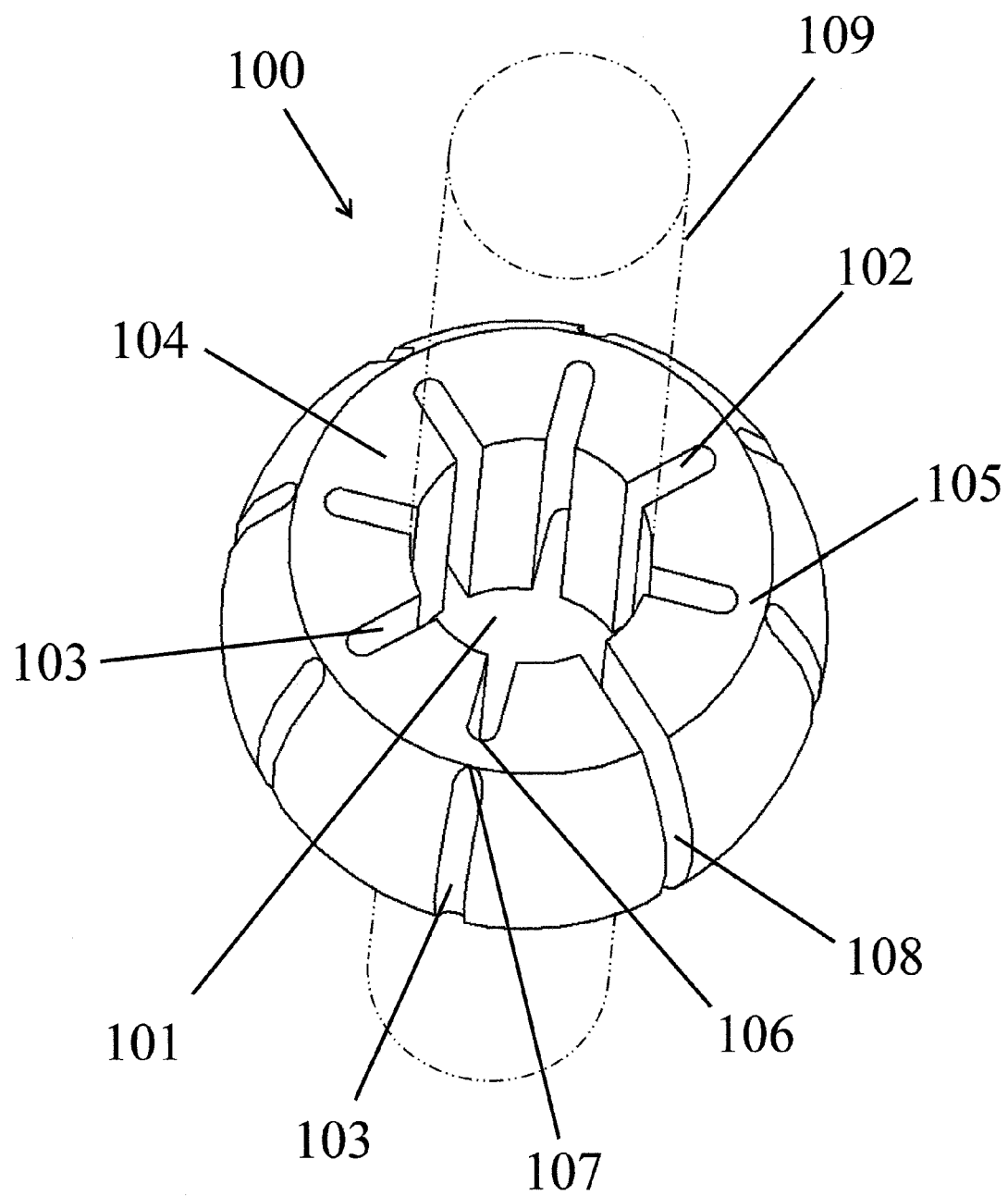
FIG. 1 is a perspective view of a spherical bearing core with a relief cut pattern according to one embodiment of the invention.

FIG. 1 shows an embodiment of such a spherical core 100 providing an annular hole 101 through the center of the core 100 for securing to an example external object, in this case a mounting shaft 109 that is round in shape, depicted with dotted lines to represent one possible attachment to the spherical core 100 according to the invention. As can be seen in FIG. 1, the core 100 is in the form of a truncated sphere 100. The truncated sphere 100 of FIG. 1 is truncated both on top and similarly on the bottom of the sphere 100. A truncated sphere is most commonly used for the core of the spherical bearing, and its depiction in FIG. 1 allows the structural modifications made to the sphere to be easily seen.

The spherical core 100 has a spherical core diameter and the shaft 109 has a shaft diameter or "object diameter" wherein the ratio of the spherical core diameter to the shaft/object diameter is greater than about 1.5. This relatively higher diameter ratio has at least two major advantages. First, the relatively higher spherical core to shaft/object diameter ratio allows for greater angular movement of the shaft 109 during initial positioning and prior to immobilization by the bearing. Second, the larger sphere size allows for a larger moment arm to resist angular tilting and side loads on the shaft.

FIG. 1 shows one pattern 102 that can be used for the relief cuts 103 in the spherical core 100. Though not passing through the core 100 from the annular hole to the outside of the core 100, the relief cuts 103 in the core 100 are made through the entire thickness of the core 100 from top to bottom so that both the inner and outer relief cut slot bottoms 106, 107 are substantially parallel to the axis of the annular hole 101 through the core 100. In the case of relief cut 108 the cut does pass through the core 100 from the annular hole 101 to the outside of the core 100 as shown in FIG. 1. However, relief cuts 103 on the outer spherical surface of the core 100 extend fully from the top to the bottom of the core 100.

The pattern of relief cuts 102 creates a series of effective deflection flexure points 105 for the spherical core segments 104. The flexure points 105 are displaced from the centerline of the annular hole 101 such that pressure on the segments 104 will always cause them to deflect toward the shaft. This has several advantages among which are providing improved immobilization by uniform contact of the segments 104 with the shaft and permitting effective immobilization with minimal clamping pressure. Because the clamping pressure required can be minimal, the releasability of the core is also enhanced.

Figure 2:
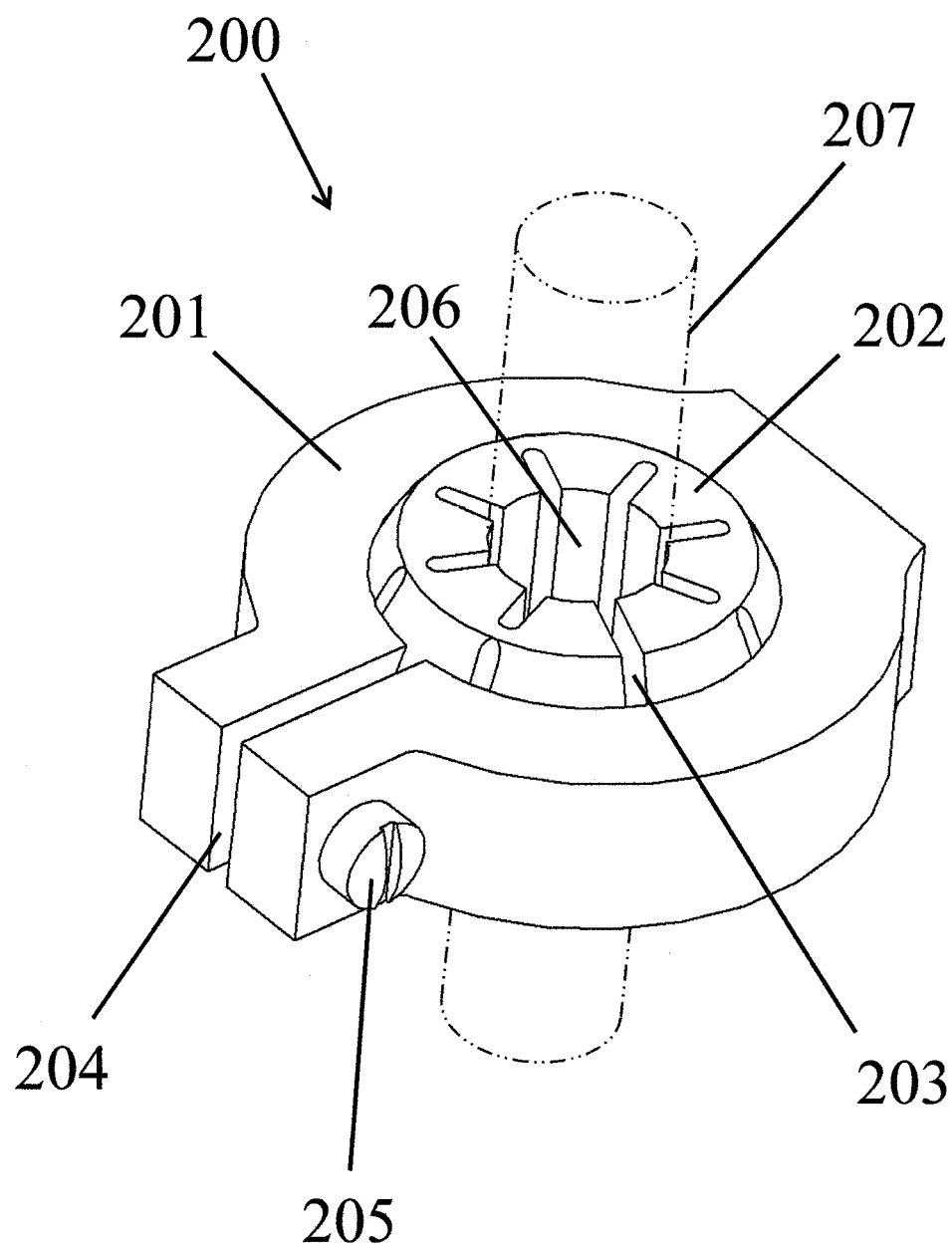
FIG. 2 is a perspective view of a spherical bearing comprising a bearing core in a bearing housing according to one embodiment of the invention.

FIG. 2 shows a spherical bearing assembly 200 comprising an outer member or housing 201 where both the outer member or housing 201 and the inner member, the spherical core 202, are split 203, 204 on planes passing substantially through the centerline of the annular hole 206 by relief cuts. The relief cuts constitute structural modifications, and the term can apply to the housing as well as the core. The housing 201 is provided with a clamping mechanism 205 that, when tightened, will compress the spherical core 202 causing it to tighten on a shaft 207 passing through the annular hole 206 of the core 202. The resulting friction in the clamped components immobilizes the shaft in the core 202 and the core 202 in the housing 201 creating in effect a friction locked spherical joint. Unique to this design are a series of radial relief cuts in the core 202, passing substantially through the axis of the annular hole 206, that cause the core 202, when compressed, to deflect uniformly around the shaft 207 regardless of the orientation of the split 203 in the core relative to the split 204 in the housing. The relatively high core diameter to shaft diameter ratio of greater than 1.5 contributes to the securement of the bearing.

Figure 3:
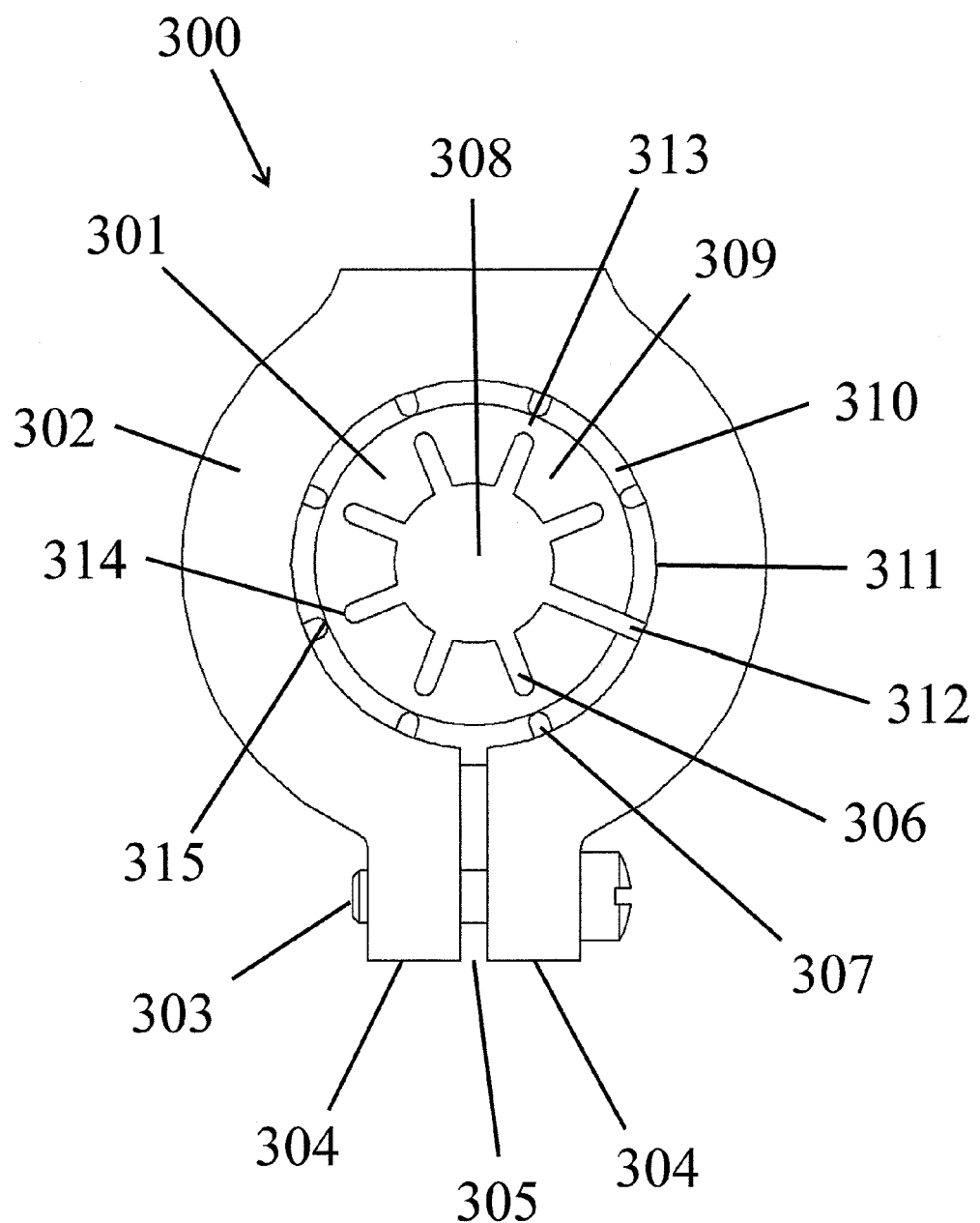
FIG. 3 is a top view of a spherical bearing with a screw disposed in the housing ears according to one embodiment of the invention.

FIG. 3 is an embodiment of an assembled bearing assembly 300 showing a spherical core 301 encased in a bearing housing 302. In FIG. 3 the housing is clamped down by a screw 303 that runs through the ears 304 of the clamp housing and is threaded into one of the ears 304 providing, when tightened, the pressure on the ears 304 that is necessary immobilize the core 301.

Although in FIG. 3 a screw 303 is used to provide the force needed to close the housing 302 and render the core 301 immobile, any other sufficiently robust closing mechanism could be used to draw the housing together. For example, a bolt or a "C" clamp could be used to draw the ears 304 together.

Returning to the FIG. 3 embodiment, the bearing housing 302 is solid except for the split 305 as shown. Nonetheless, the force provided by the closing mechanism 303, in this case a threaded screw 303, is sufficient to effectively immobilize the bearing when tightened and release the bearing when loosened. This immobilization is optimized given the greater than 1.5 core diameter to shaft diameter ratio.

In FIG. 3 consider the arrangement of the relief cuts 306, 307. The inner relief cuts 306 substantially radiate out from the central annular hole 308 with a core split 312 also present to allow the core 301 to deform slightly when the housing 302 is tightened. The cuts 306 segment the inner core surface and the inner segments 309 so formed can engage the surface of a shaft passing through the annular hole 308 as the core 301 is deformed by the closing pressure caused by the bearing housing 302. In like manner the outer relief cuts 307 provide segments 310 that allow flexure of the core 301 and still allow the outer surface of the core 301 to engage the inner surface of the clamp housing 311 when the housing 302 is tightened.

One purpose of the relief cuts 306, 307 is to increase the flexibility of the core 301 so that it can flexibly engage the shaft and the bearing housing 302 surface. The cuts 306, 307 also provide extra room inside the bearing assembly 300 for flexing to occur and minimize the closing force needed to immobilize the core 301.

In FIG. 3 the inner relief cuts 306 are opposite the outer relief cuts 307. Although such an arrangement is not necessary for the invention to successfully operate, making the relief cuts in this manner provides additional flexibility.

This pattern of relief cuts 306, 307 creates a series of effective deflection flexure points 313 for the spherical core segments 309, 310. The flexure points 313 are displaced from the centerline of the shaft bore 308, that is the annular hole 308, such that pressure on the segments 309, 310 will always cause them to deflect toward the shaft, and the deflection flexure points 313 so formed will allow the spherical core 301 to accommodate minor variations in the shape of the central shaft used and in the shape of the bearing housing 302 while maximizing the contact surface area between the inner core segments 309 and the shaft and the outer core segments 310 and the housing 302. This provides improved immobilization by uniform contact of the segments 309, 310 permitting effective immobilization with minimal clamping pressure. Because the clamping pressure required can be minimal, especially with the greater than 1.5 core diameter to shaft diameter ratio, the reliability and releasability of the bearing assembly 300 are enhanced.

Because the inner and outer relief cut bottoms 314, 315 are parallel with each other and with the annular hole 308 axis, from another perspective the effect of this arrangement is to provide a flexible cylindrical band that envelops within the core 301 and is defined by the outer ends 314 of the inner relief cuts 306 and the inner ends 315 of the outer relief cuts 307 and accommodates imperfections in the shaft (not shown in FIG. 3) or in the bearing housing 302.

Further, in the event a shaft is used that is not substantially round, the bearing assembly 300 can accommodate and maximize its ability to immobilize the shaft.

Figure 4:
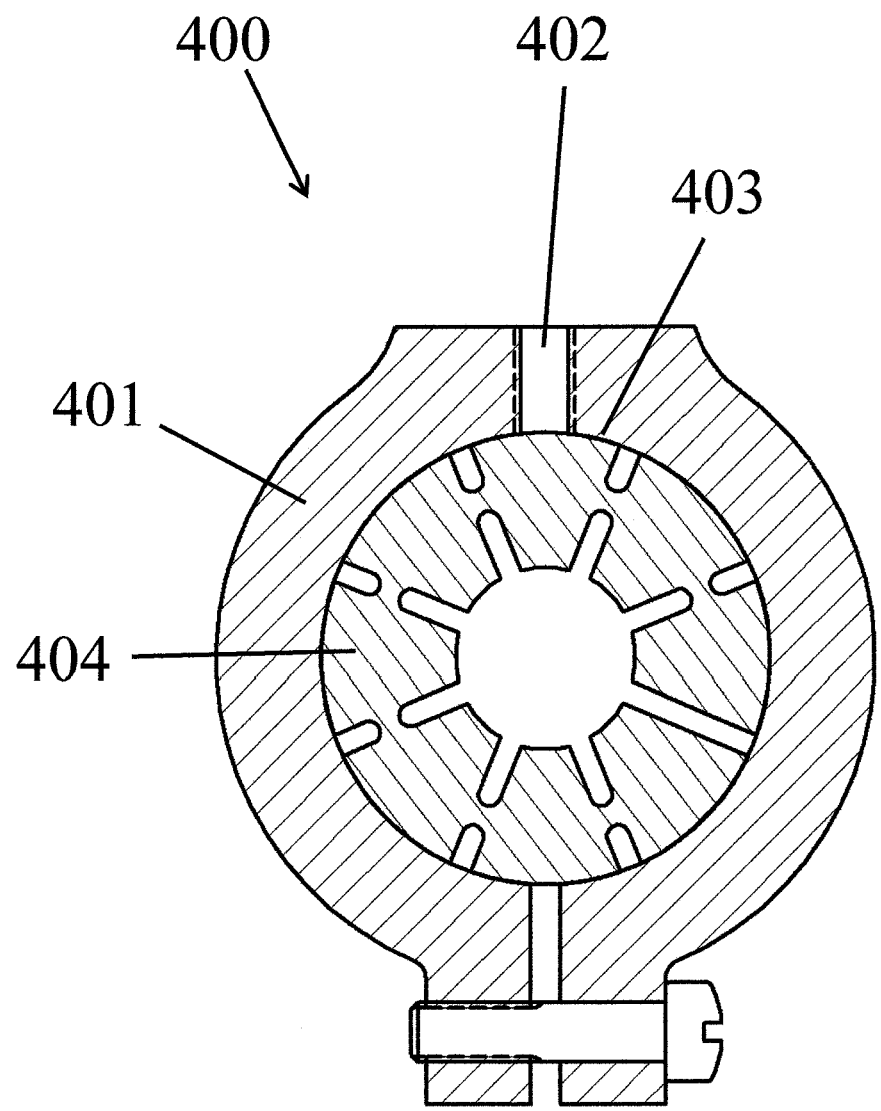
FIG. 4 is a top cross sectional view of a spherical bearing comprising an attachment mounting hole in the housing according to one embodiment of the invention.

In another embodiment FIG. 4 shows a bearing assembly 400 where the bearing housing 401 comprises a threaded mounting receptacle 402. This embodiment demonstrates how the bearing housing 401 could be modified to allow the assembled bearing 400 to be affixed to another piece of apparatus allowing the other piece of apparatus to be mounted on the bearing assembly 400 or allowing the bearing assembly 400 to be mounted on another piece of apparatus. In this way the bearing assembly 400 can be used to join two or more pieces of apparatus together. To do so one includes additional mounting receptacles.

As shown in FIG. 4 the mounting receptacle 402 runs through the bearing housing 401 and extends to the outer surface 403 of the bearing 404 and can be used, if needed, to help immobilize the bearing when a threaded apparatus actually contacts the surface of the core 403.

Figure 5:
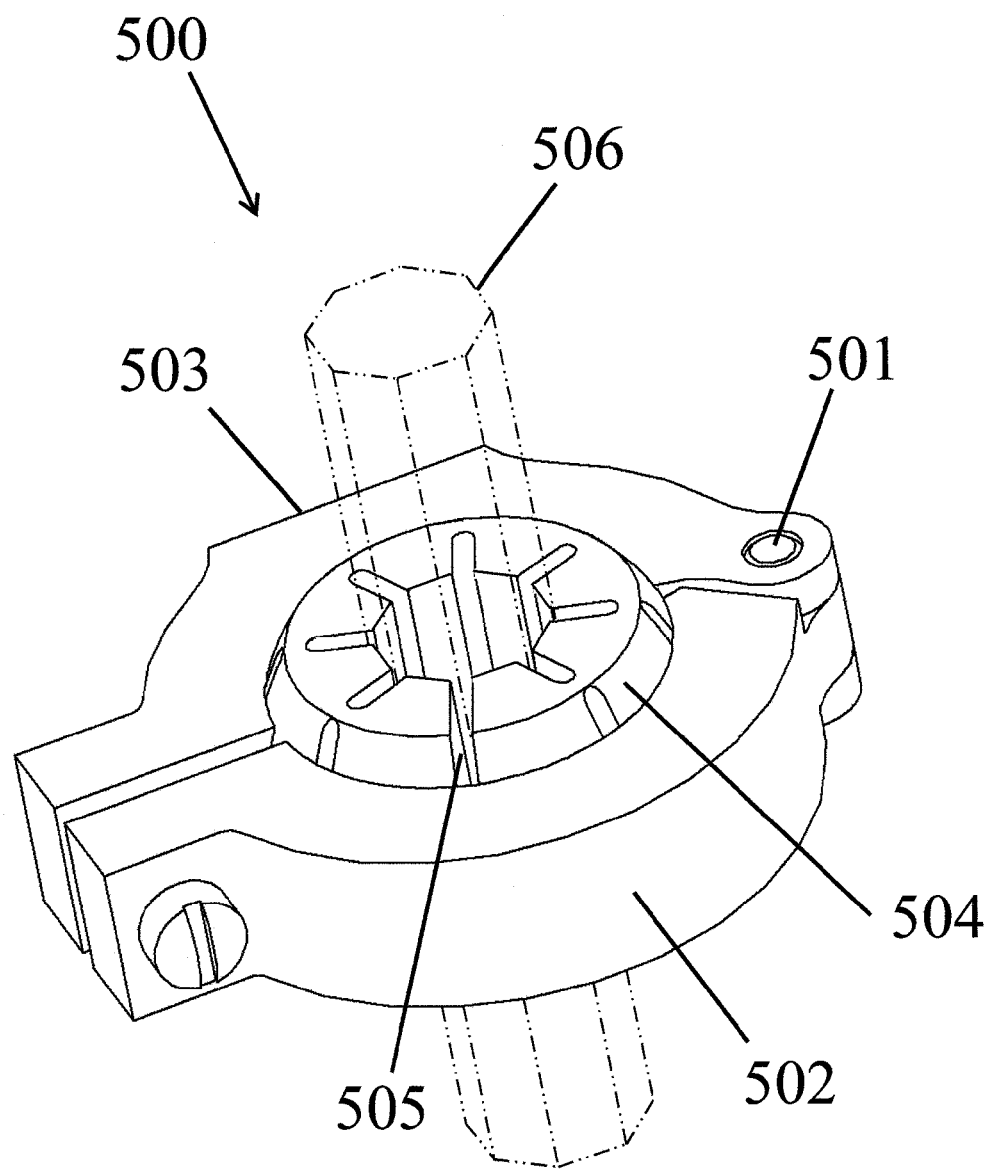
FIG. 5 is perspective view of a spherical bearing with a hinged housing according to one embodiment of the invention.

In yet another embodiment FIG. 5 shows a bearing assembly 500 where a hinge 501 comprises a part of the bearing housing 502. This is another example of the flexibility in design of which the invention is capable. FIG. 5 depicts a shaft 506 that is not round in shape, depicted with dotted lines to represent one possible interface with the bearing core 504 according to the invention.

In some applications it is necessary to assemble the bearing with the bearing housing at the point of use, as where fit or size place restrictions on the installation. FIG. 5 demonstrates an embodiment of this flexibility. In this embodiment the hinge 501 has been added so that if the bearing core 504 is already installed on a shaft 506, the housing 502 can be installed without the need to slide the housing 502 along the shaft. Rather, the housing 502 can be installed over the bearing core 504 from a position perpendicular to the shaft 506.

From another aspect the housing can be constructed in two parts and secured using two sets of ears similar to elements 304 shown in FIG. 3. An example of such an arrangement could be a pillow block that is mounted on a surface. The pillow block has a bearing core secured between the pillow block base on one side and the pillow block retainer on the other side. Both ends of the pillow block can be secured together with screws similar to the ear 304 and screw 303 arrangement of FIG. 3.

In embodiments where the bearing core 504 is made of sufficiently flexible material, the bearing core 504 can be slipped over a shaft, because the bearing core 504 includes a split 505. The housing 502 can then be installed over it even if the housing is made of non-flexible material. Such flexibility is very useful when the ends of a shaft are inaccessible, but a spherical bearing needs to be installed.

In another embodiment the core can be cut through as in drawing element 108 shown in FIG. 1 but in several different places, and the multi-piece core can be used to surround a shaft and can be held in place by the housing. The housing can then be clamped and tightened to releasably immobilize the bearing on the shaft.

In yet another embodiment the core can be hinged for placement around a shaft with a clampable housing placed over the hinged core to immobilize the bearing on the shaft.

Returning to the embodiment shown in FIG. 5, the side of the housing 502 is flattened 503 to allow the bearing 500 to be mounted on a flat surface. In other embodiments the housing can similarly be modified in many different ways to accommodate the practical needs of the application.

For example, in a different embodiment where space is limited the housing can be split into two or more pieces that can be assembled around a core and strapped together with a strap clamp. Tightening the strap clamp then compresses the housing around the core and can immobilize or free the bearing depending on how tightly the strap clamp is adjusted.

Figure 6:
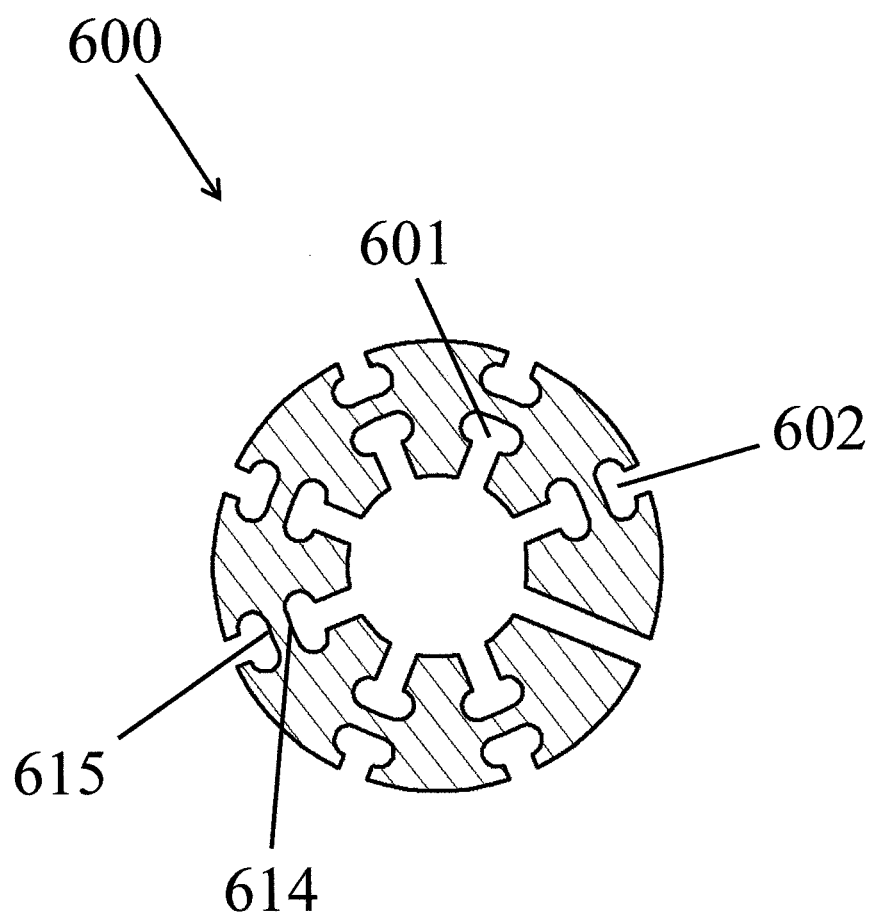
FIG. 6 is a top cross sectional view of a spherical bearing core with structural modifications according to one embodiment of the invention.

In yet another embodiment FIG. 6 shows how the spherical core 600 can be modified to provide enhanced flexibility and to enhance the banding effect discussed above in reference to FIG. 3. In this embodiment the outer ends 614 of the inner relief cuts 601 and the inner ends 615 of the outer relief cuts 602 are broadened to increase the flexibility of the spherical core 600. By choosing the design of the relief cuts, different properties of flexibility can be achieved and other effects such as enhanced band strength, deflection, flexure and shaft or housing contact pressure distributions can be achieved.

In other embodiments a bearing assembly can comprise different materials to modify the performance of the bearing assembly.

For example, different materials can be chosen to cause the bearing to provide more or less "lash." In one example a very flexible bearing material can be chosen to allow the bearing to absorb limited amounts of force when a torque is suddenly imposed on either a central shaft or the bearing housing.

In another embodiment, combinations of materials can be chosen to provide the contact surfaces of the inner segments and the outer segments different coefficients of friction thus allowing controlled slippage of the joint if desired. Additionally, the materials used for the bearing housing can also be chosen to provide specific frictional and/or torque response properties.

In another embodiment the surface finish of the annular hole and/or the spherical surfaces can be modified to provide specific frictional response. For example, the surfaces can be modified or coated to enhance frictional binding when the bearing is clamped.

Figure 7:
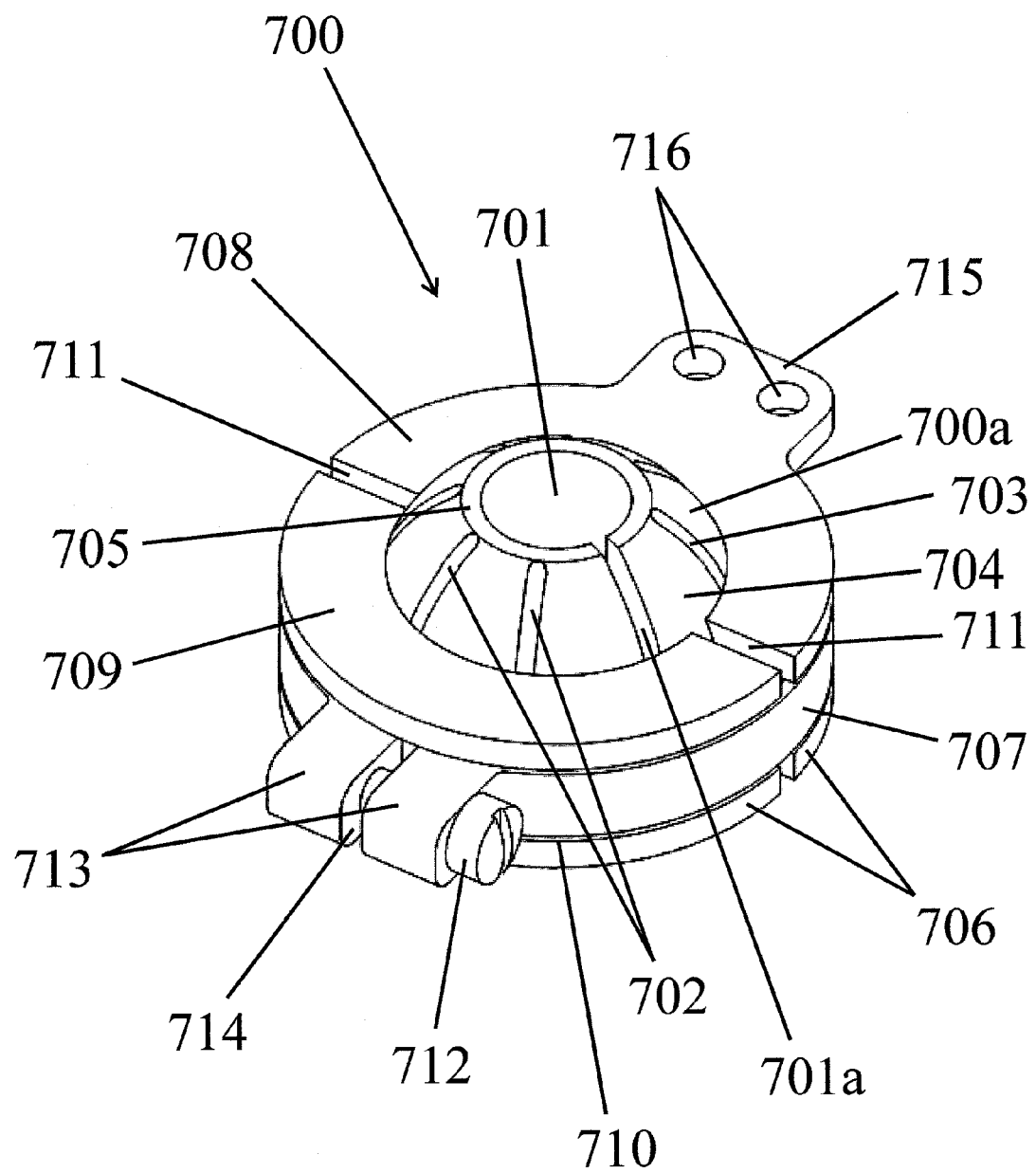
FIG. 7 is a perspective view of a spherical bearing assembly according to one embodiment of the invention.

It will be appreciated that in some anticipated embodiments of the invention, the housing can be constructed without ears 304 as in the embodiment depicted in FIG. 3, but instead with one or more relief cuts splitting the housing. For example, FIG. 7 depicts a spherical bearing assembly 700 including a spherical core 700a having a core split 701a, a chamfered truncation 705 at each opening of an annular hole 701, and a pattern 702 of relief cuts 703 creating spherical core segments 704. A strap clamp 707 surrounds the bearing housing 706 to compress the housing 706 on the bearing core 700a.

Figure 8:
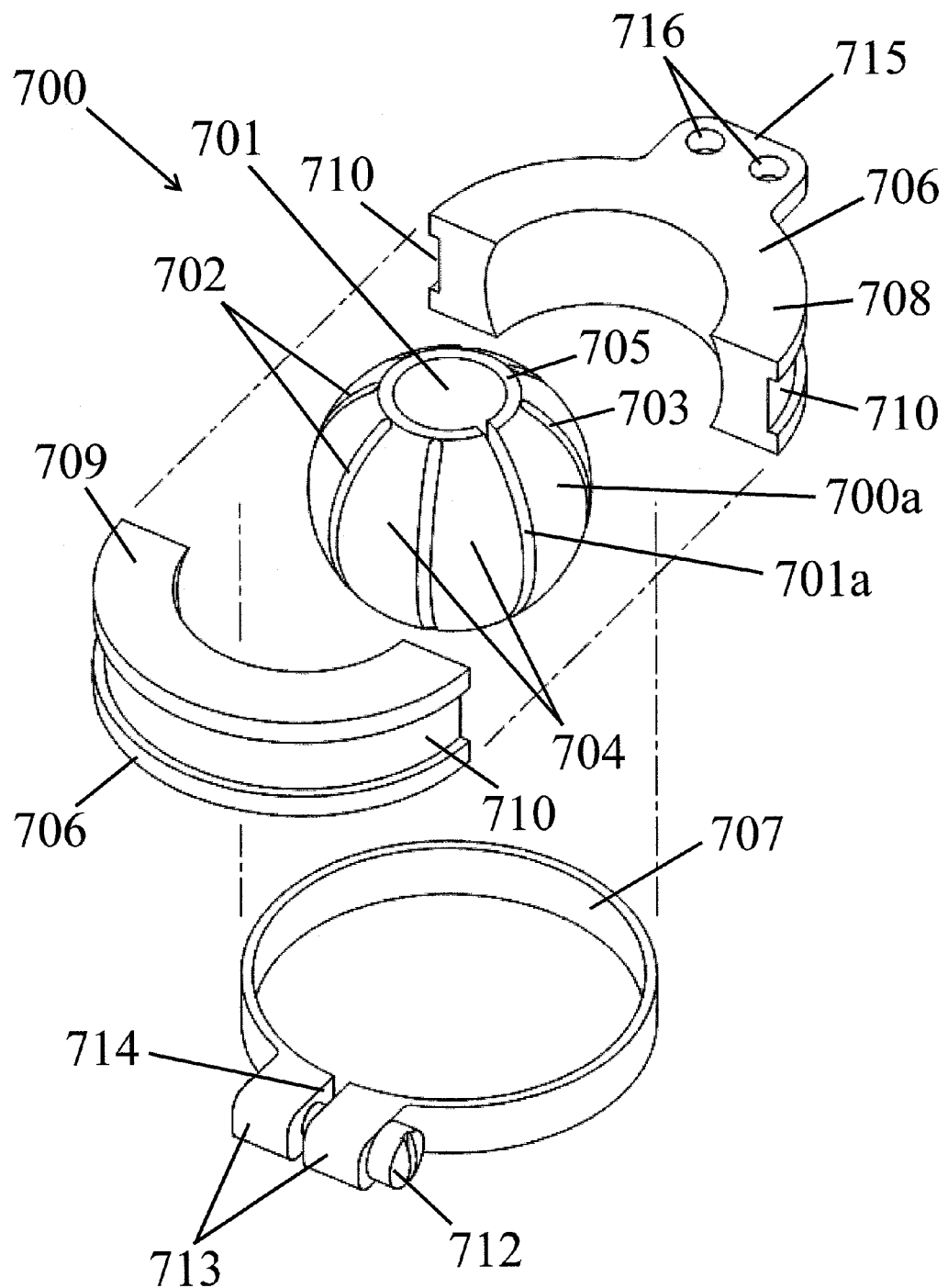
FIG. 8 is an exploded view of the spherical bearing assembly of FIG. 7.

Compare FIG. 7 to the exploded view of the same spherical bearing assembly 700 of FIG. 8. The relief cuts 703 extend fully from the chamfered truncation 705 at the top of the core 700a to matching truncation (not shown in FIGS. 7 and 8) at the bottom of the core 700a. The bearing housing 706 is divided into housing base 708 and housing cap 709 portions separated by a housing split 711. The strap clamp 707 is positioned to fit, when attached to the bearing assembly 700, into a circular recess 710 that extends around both the housing base 708 and housing cap 709 to secure the base 708 and cap 709 together such that when a sufficient clamping force is applied to the strap clamp 707, the bearing is immobilized. A tightening screw 712 extends through two ears 713 at a clamp split 714 to allow for tightening of the strap clamp 707 to sufficient clamping force for immobilization. The housing base 708 includes a mounting flange 715 with mounting holes 716 to allow for fixed engagement of the housing base 708 to an external object such that any shaft or other engaged member will remain in a relative fixed position when immobilized by the bearing assembly 700.

The versatility of the invention is demonstrated in the embodiments depicted in FIGS. 7 and 8. The depicted spherical joint bearing 700 utilizes a two piece housing 706 and strap clamp 707 coupled with a simplified spherical core 700a to achieve enhanced strength, functionality, and manufacturing efficiency. The housing base 708 and housing cap 709 used in conjunction with the strap clamp 707 provide a flexible housing configuration with optimal conformity to the spherical core 700a. When tightened, the strap clamp 707 develops uniform hoop tension which, when applied to the nearly constant cross section housing base and cap 708 and 709 separated by housing split 711, works to reduce the diameter of the housing 706 and compresses the spherical core 700a in a very uniform, belt-like manner. This uniform compression of the spherical core 700a allows the use of a simplified spherical core 700a which contains only outer relief cuts 703.

In a typical spherical core 100, as depicted in FIG. 1, flexure points 105 created between the inner and outer relief cuts 103 form a functional flexure ring in the spherical core. When stiffer housing configurations are used, it becomes increasingly advantageous to increase the diameter of this flexure ring, which in essence moves the flexure points 105 closer to the outer diameter of the spherical core 100. Consider the use of a relatively rigid housing, such as in the context of the housing 200 in FIG. 2 or the housing created by the bearing assembly 502 and hinge 501 in FIG. 5. Such a housing when compressed to a reduced diameter by a clamping mechanism, such as the clamping mechanism 205 depicted in FIG. 2, will tend to deflect unevenly with a greater diameter reduction sideways than lengthwise, thus squeezing the spherical core 202 (504 in FIG. 5) in a more nutcracker-like fashion. For these types of housings, a spherical core with a maximized diameter flexure ring is desirable since wider spaced flexure points allow the spherical core segments to deflect more easily toward the contained external object such as a shaft. In comparison, a less rigid strap clamp type housing such as the housing 706 in FIG. 7 applies a near uniform compression load to all spherical core segments 704 irrespective of the flexure ring diameter. Thus, with further reference to FIG. 7, the spherical core 700a used in conjunction with the strap clamp housing 706 incorporates a minimum diameter flexure ring located directly adjacent the shaft annular hole 701, effectively eliminating the inner relief cuts.

It follows that strap clamp embodiments of the invention, such as those shown and described in FIGS. 7 and 8, not only provide optimum housing-to-spherical bearing conformance and spherical bearing-to-shaft/external object conformance, but such embodiments also utilize geometric configurations that have lower manufacturing costs. For example, in FIGS. 7 and 8, the depicted two piece housing 706 can be more easily machined or molded since it does not contain an enclosed spherical cavity such as the housing 201 depicted in FIG. 2. Similarly, the spherical core 700a can be more efficiently machined or molded since inner relief cuts have been completely eliminated. In addition, usable strap clamps of the type contemplated to be used with the current invention are also commercially available and relatively inexpensive.

Figure 9:
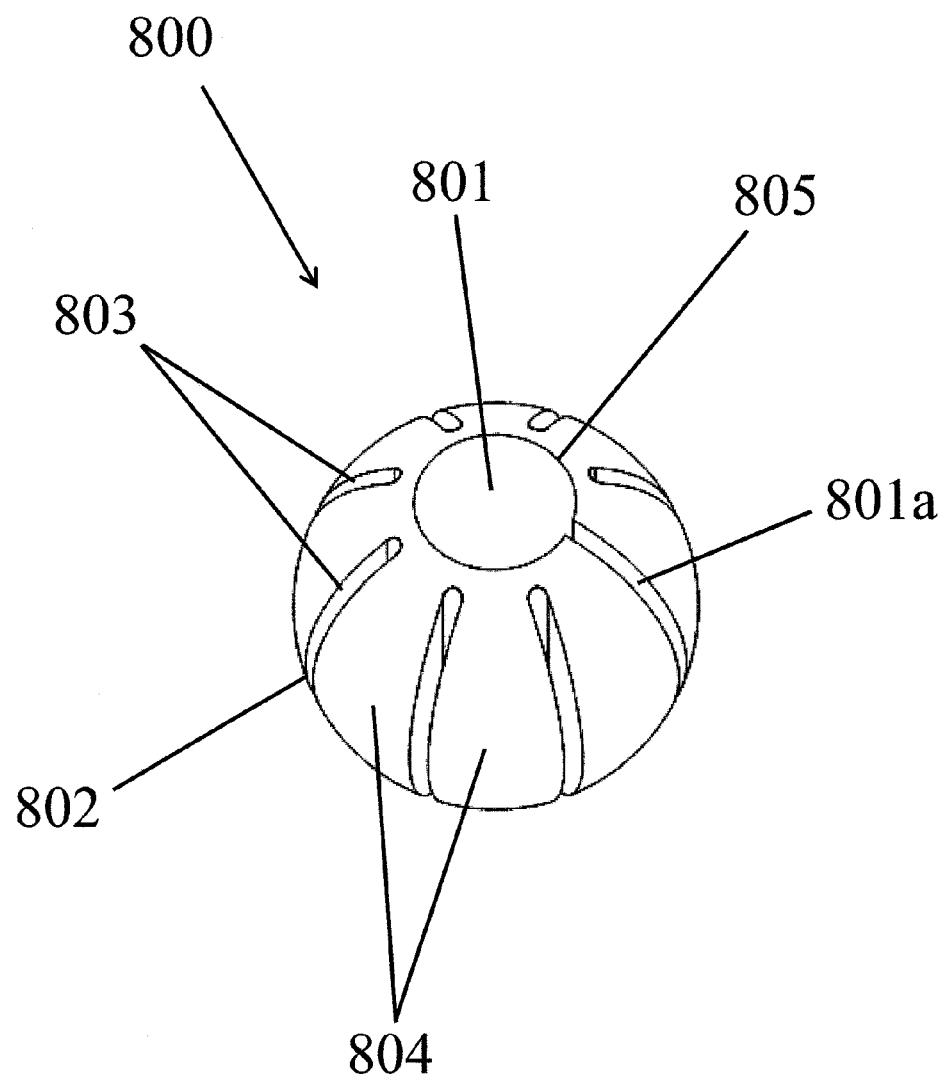
FIG. 9 is a perspective view of a spherical core according to one embodiment of the invention.

Although embodiments of the invention have been shown and described in FIGS. 7 and 8 as including a spherical core 700a having a chamfered truncation 705, it will be appreciated that spherical cores lacking such chamfers or otherwise with minimal additional truncation are also contemplated within the intended scope of the invention. For example, FIG. 9 depicts a spherical core 800 having spherical core segments 804 separated by a pattern 802 of relief cuts 803 wherein the spherical outer surfaces of the segments 804 and core split 801a extend to an edge 805 of the annular hole opening 801 with no truncated chamfer separating the edge 805 from the spherical outer surfaces of the segments 804, such that the amount of sphere truncation is minimized to that required to accommodate a shaft or other immobilized object. Such minimized truncation also maximizes the sphere area captured within the housing when the core 800 and its immobilized object within the bearing assembly are positioned in a maximum rotation position prior to immobilization.

Figure 10:
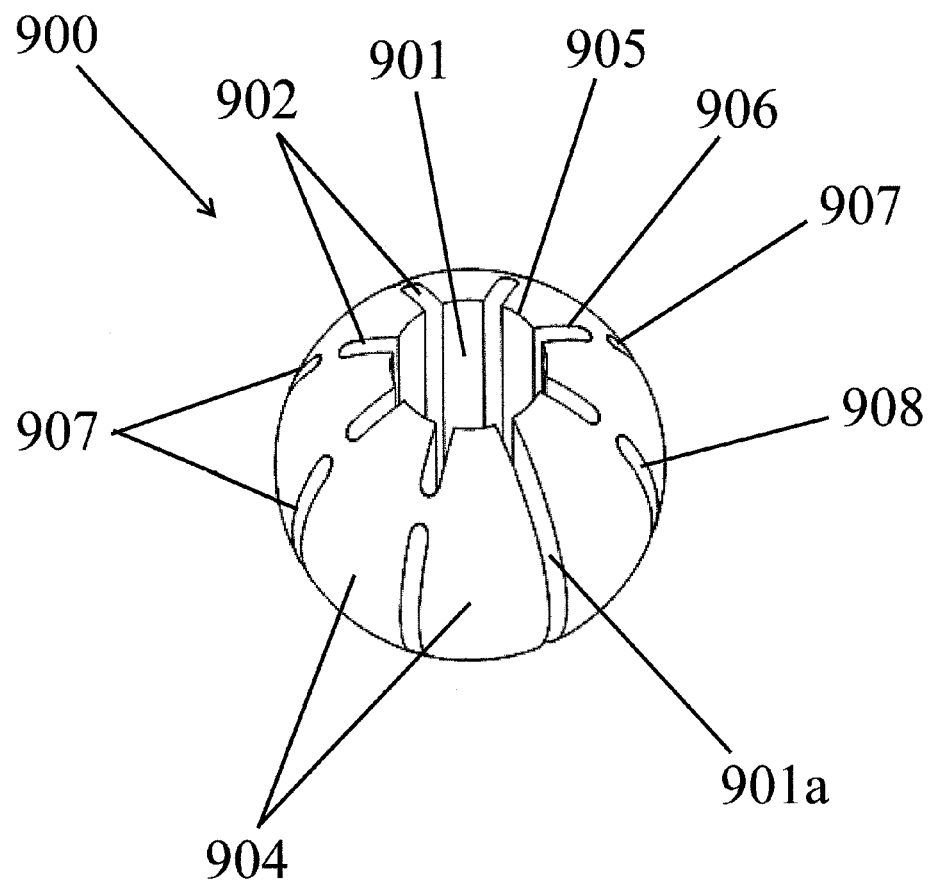
FIG. 10 is a perspective view of a spherical core according to one embodiment of the invention.

It will be further appreciated that similar minimally truncated spheres can also include both inside and outside relief cuts. For example, FIG. 10 depicts a spherical core 900 having spherical core segments 904 separated by a pattern 902 of inner relief cuts 906 and a pattern 908 of outer relief cuts 907 wherein the spherical outer surfaces of the segments 904 and core split 901a extend to an edge 905 of the annular hole opening 901, with no truncated chamfer separating the edge 905 from the spherical outer surfaces of the segments 904. Sphere truncation is also minimized in this embodiment to that required to accommodate a shaft or other immobilized object.

Figure 11:
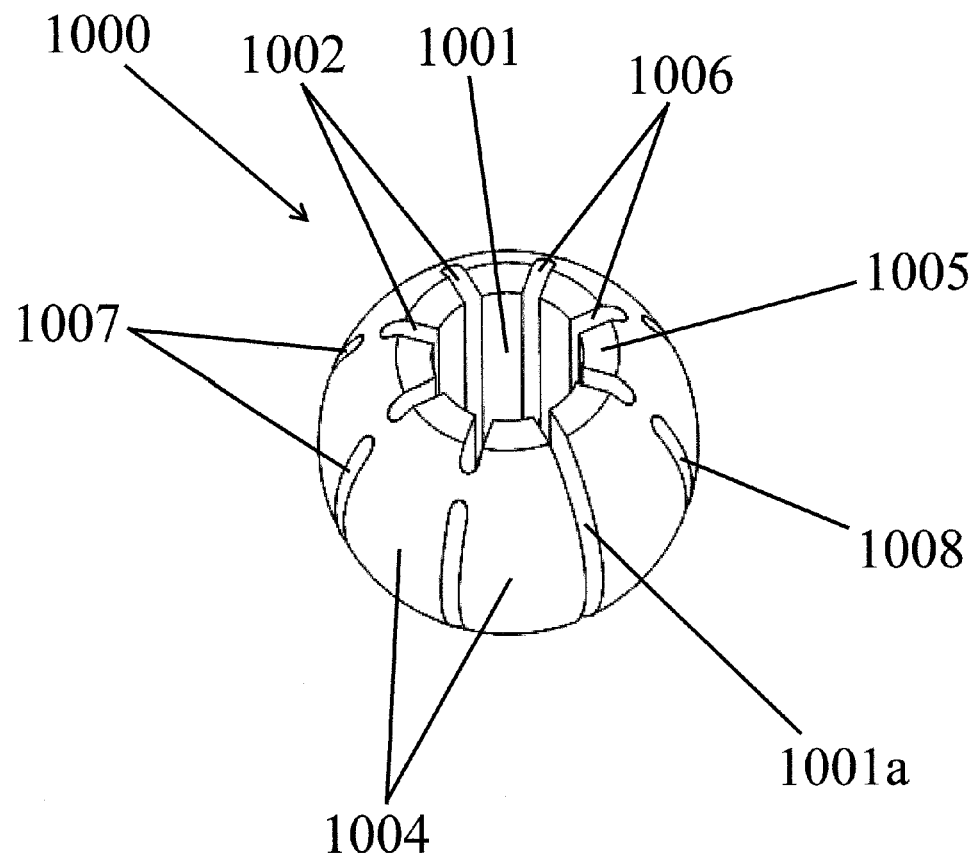
FIG. 11 is a perspective view of a spherical core according to one embodiment of the invention.

The invention also contemplates a combination of inside and outside relief cuts in the context of truncated spheres. For example, FIG. 11 depicts a spherical core 1000 of the invention having spherical core segments 1004 similarly separated by a pattern 1002 of inner relief cuts 1006 and a pattern 1008 of outer relief cuts 1007 wherein the spherical outer surfaces of the segments 1004, annular hole 1001, and core split 1001a extend to a flat truncation surface 1005 separating the spherical outer surfaces of the segments 1004 from the annular hole 1001.

Figure 12:
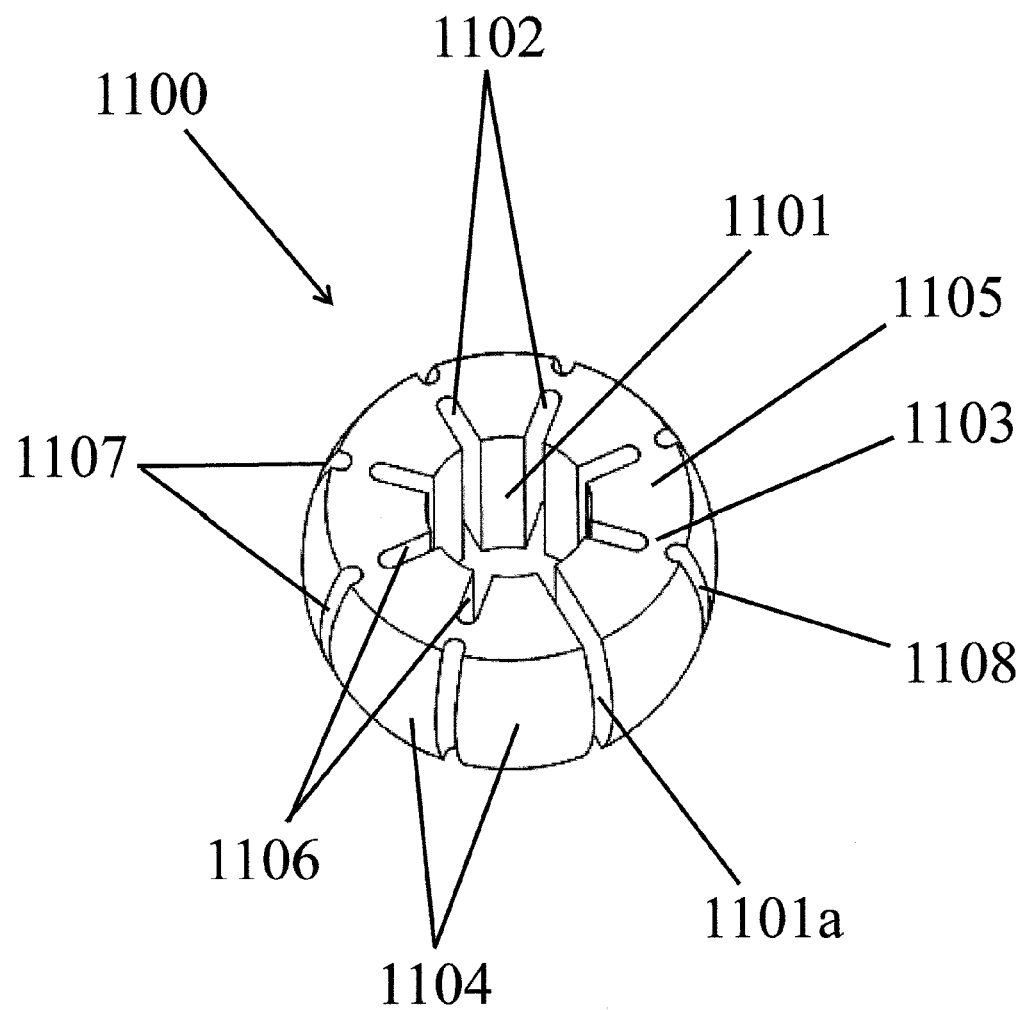
FIG. 12 is a perspective view of a spherical core according to one embodiment of the invention.

The invention further contemplates a combination of inside and outside relief cuts in the context of highly truncated spheres. For example, FIG. 12 depicts a spherical core 1100 of the invention having spherical core segments 1104 similarly separated by a pattern 1102 of inner relief cuts 1106 and a pattern 1108 of outer relief cuts 1107 wherein the spherical outer surfaces of the segments 1104, annular hole 1101, and core split 1101a extend to a flat high truncation surface 1105 separating the spherical outer surfaces of the segments 1104 from the annular hole 1101. Both inner relief cuts 1106 and outer relief cuts 1107 extend from the top flat truncation surface 1105 to a matching flat truncation surface (not shown in FIG. 12) at the bottom of the core 1100.

Compare the spherical core 1100 of FIG. 12 with the highly truncated core 100 of FIG. 1. From such comparison, it will be appreciated that the invention contemplates that outer relief cuts, such as the outer relief cuts 1107 of FIG. 12 can extend into either the slightly or highly truncated surfaces of a sphere, such as into the high truncation surface 1105 of FIG. 12, or be limited to extending only within outer spherical surfaces of the segments, such as in the outer relief cuts 103 of FIG. 1. However, in general, spherical core flexibility is increased by moving flexure points (or flexure ring) farther away from the center of the core.

For example, the positioning of the flexure points 105 in FIG. 1 closer to the outer spherical surfaces of the segments 104 in FIG. 1 would tend to increase flexibility versus the more inside positioning of the flexure points 1103 in FIG. 12, provided both cores 100 and 1100 utilized similar construction materials and dimensioning.

Figure 13:
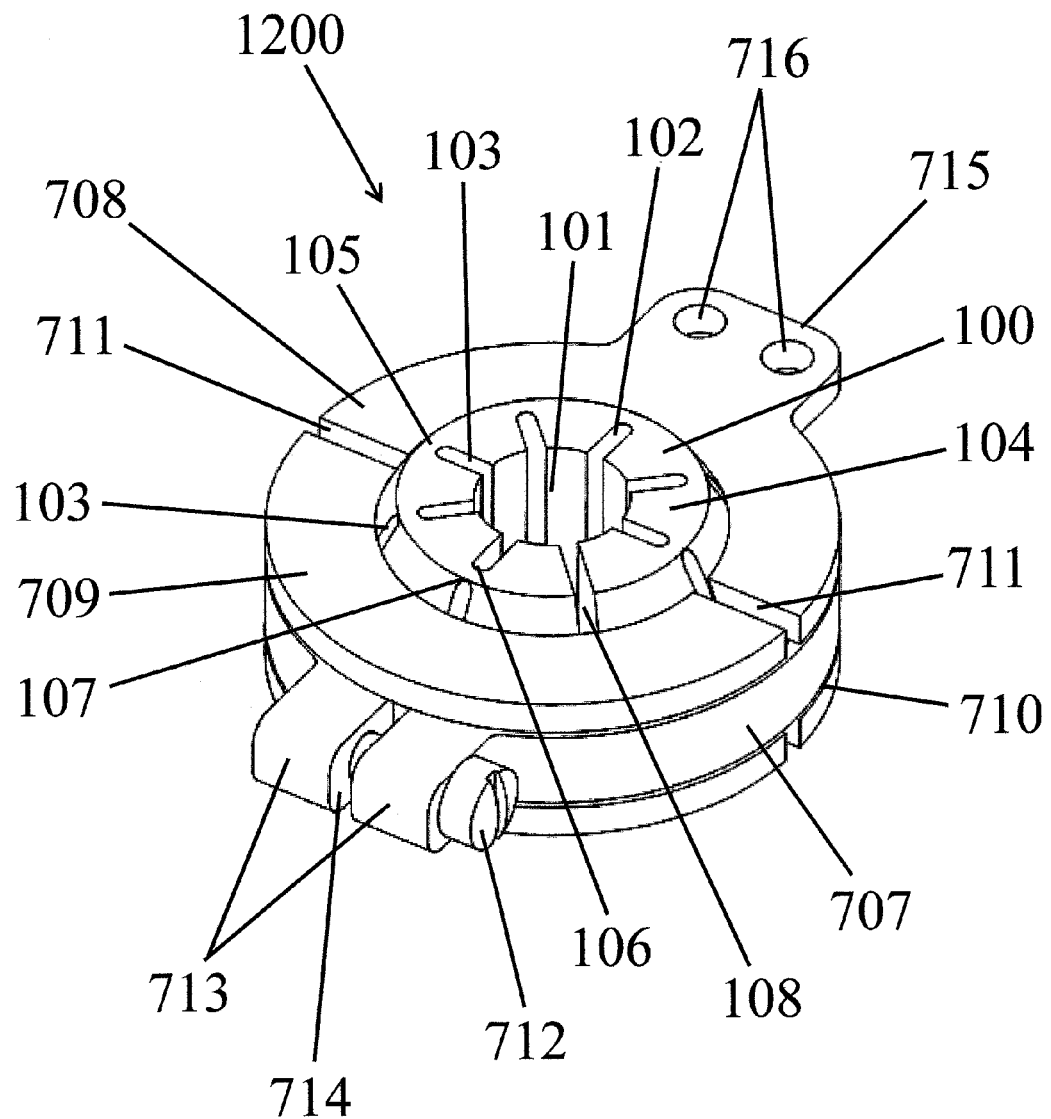
FIG. 13 is a perspective view of a spherical bearing assembly according to one embodiment of the invention.

As an example of a further combination of elements as contemplated by the invention, FIG. 13 depicts a spherical bearing assembly 1200 of the invention having a spherical core 100 of the type depicted in FIG. 1 combined with a bearing housing 706, housing base 708, housing cap 709, and strap clamp 707 of the types depicted in FIG. 7.

Figure 14:
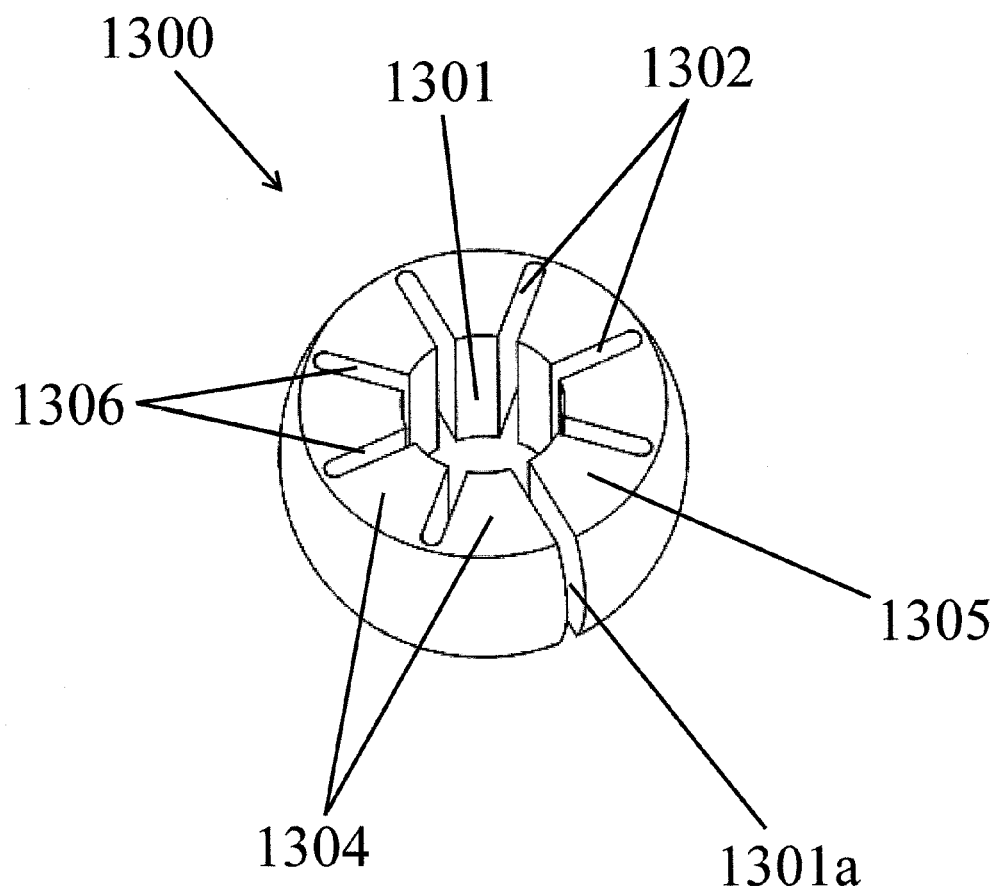
FIG. 14 is a perspective view of a spherical core according to one embodiment of the invention.

The invention also contemplates spherical cores having inner relief cuts only. For example FIG. 14 depicts a highly truncated spherical core 1300 having spherical core segments 1304 separated by a pattern 1302 of inner relief cuts 1306 wherein the segments 1304 are separated only by the inner relief cuts 1306 and a pattern of outer relief cuts is absent along the spherical outer surfaces of the segments 1304 except at the core split 1301a, the annular hole 1301 being separated from the spherical outer surfaces of the segments 1304 by the high truncation surface 1305.

It will be appreciated that the strap clamps can incorporate different types of tightening mechanisms within the intended scope of the invention. In addition, joint assemblies of the invention can also incorporate different type of mounting features to enable fixed immobilization of immobilized objects.

Figure 15:
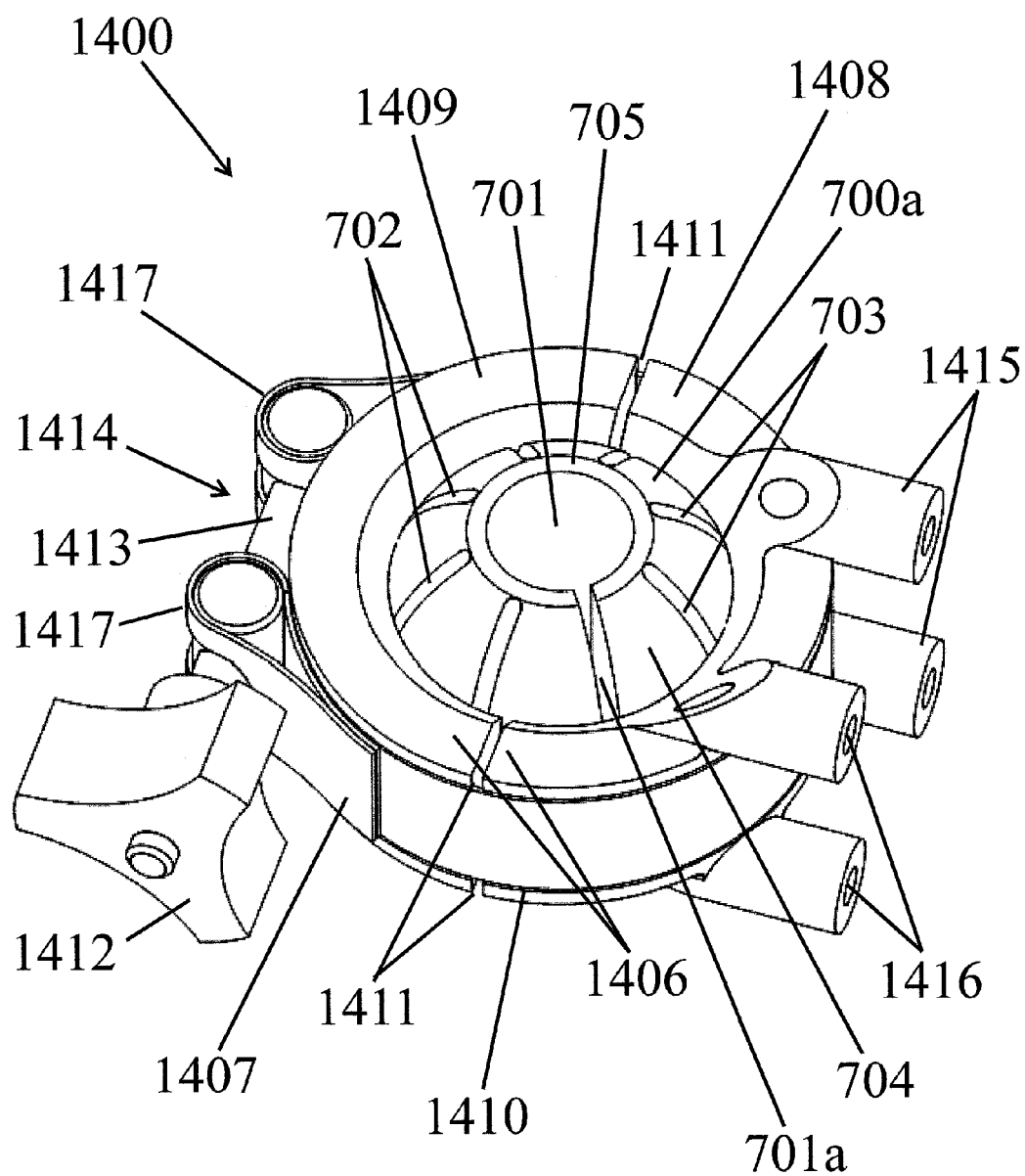
FIG. 15 is a perspective view of a spherical bearing assembly according to one embodiment of the invention.
Figure 16:
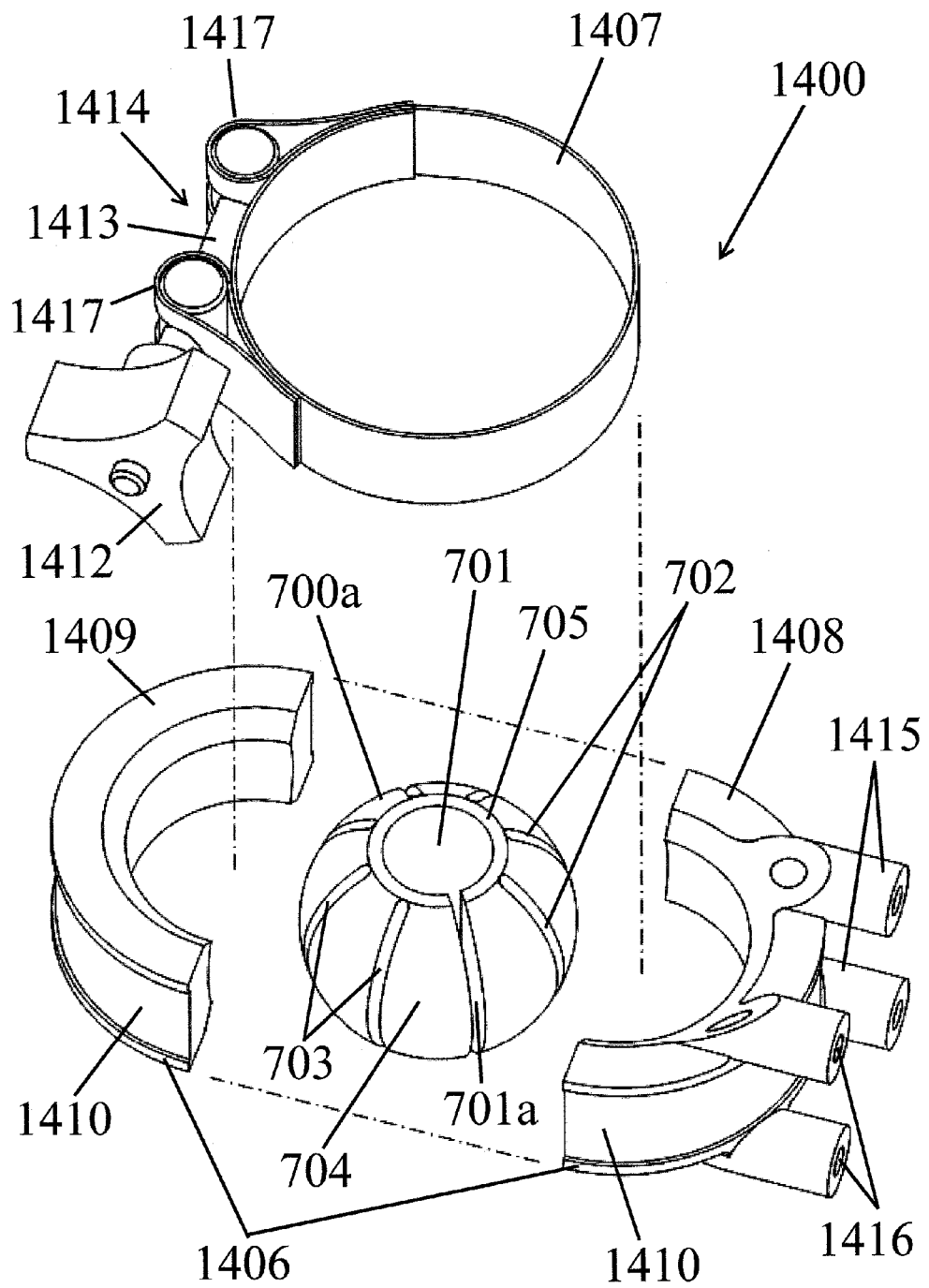
FIG. 16 is an exploded view of the spherical bearing assembly of FIG. 15.

For example, FIG. 15 depicts a spherical bearing assembly 1400 of the invention utilizing a spherical core 700a of the type depicted in FIG. 7 having a pattern 702 of outside relief cuts 703 only that extend up to a low truncation surface 705 near the opening of the annular hole 701. The housing base 1408 and housing cap 1409 of the bearing housing 1406 are compressed around core 700a with a strap clamp 1407 that engages both the base 1408 and cap 1409 and compresses the housing 1406 at a recess 1410 to compress and immobilize the core 700a. The strap clamp 1407 is tightened using a T-bolt 1413 extending through two strap ears 1417 located at the strap split 1414 and adjusted to an immobilization tightness with a tightening knob 1412. FIG. 16 is an exploded view of the bearing assembly 1400 of FIG. 15, with the base 1408 and 1409 separated from each other at the housing split 1411 depicted in FIG. 15.

Comparing FIGS. 15 and 16, the housing base 1408 includes multiple mounting legs 1415 each having a threaded hole 1416. In the embodiment depicted, the mounting legs 1415 are formed directly into the structure of the base 1408 and commonly orient the threaded holes 1416 to allow for engagement of a common planar surface (not shown). This arrangement allows the bearing assembly 1400 to immobilize an immobilized object in a fixed relation to the planar surface once the immobilization has been completed by tightening the strap clamp 1407 with the T-bolt 1413. The particular arrangement of four mounting legs 1415 in a square pattern is particularly useful in that it allows for easy detachment and 90-degree or 180-degree rotation of the housing 1408 from the planar surface with appropriate threaded hardware (not shown). Although the invention is shown and described using a four-legged attachment arrangement, it will be appreciated that other fixed attachment arrangements are also within the anticipated scope of the invention.

Figure 17:
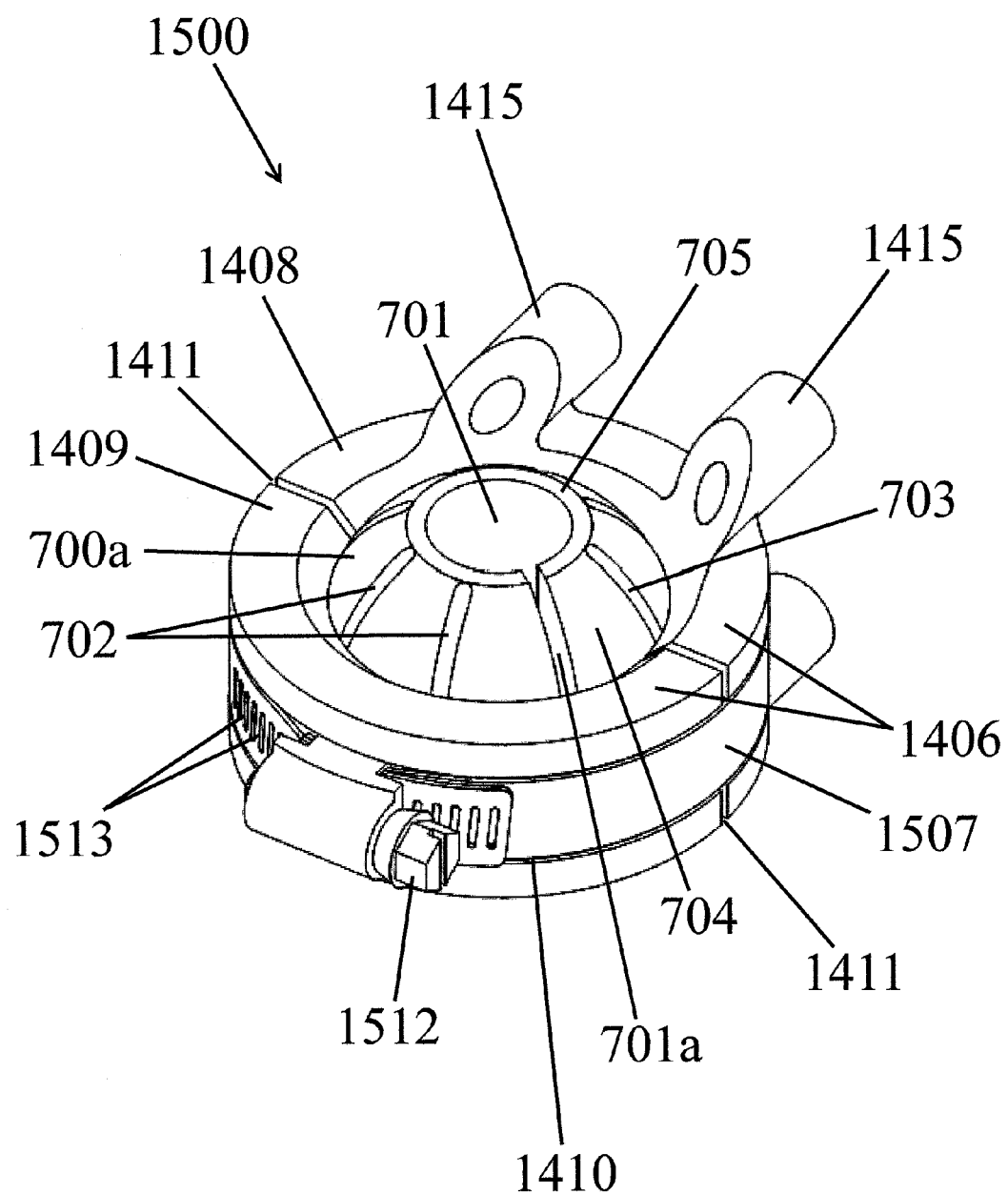
FIG. 17 is a perspective view of a spherical bearing assembly according to one embodiment of the invention.

FIG. 17 depicts a bearing assembly 1500 of the invention also utilizing a spherical bearing core 700a of the type depicted in FIGS. 7, 15, and 16 and having bearing housing 1406 of the type depicted in FIGS. 15 and 16, including a housing base 1408 separated from a housing cap 1409 by a housing split 1411, with four mounting legs 1415 positioned on the housing base 1408. A strap clamp comprises a hose clamp 1507 that compresses the base 1408 and cap 1409 of the housing around the recess 1410, but is tightened using a tightening screw 1512 that engages notches 1513 located along portions of the length of the clamp 1507.

Figure 18:
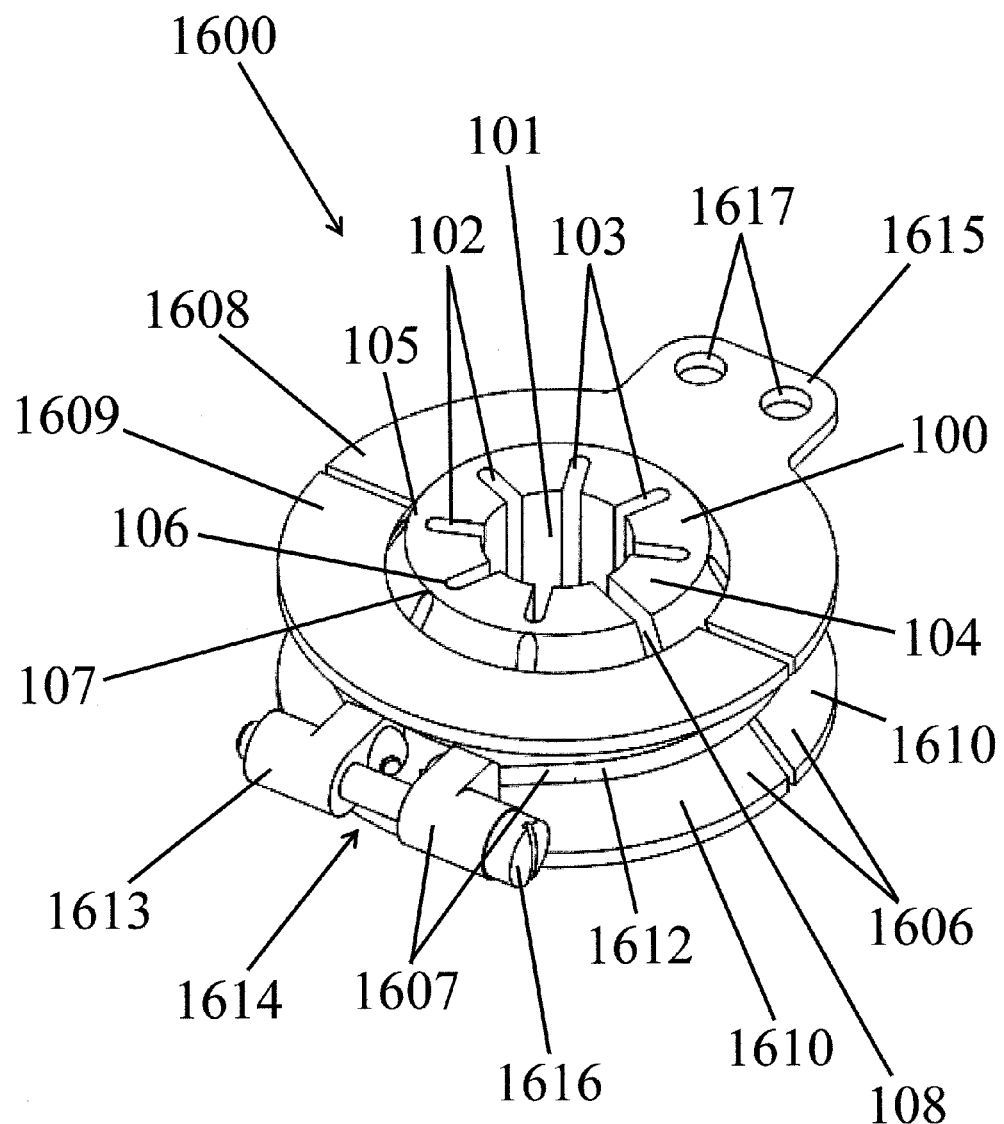
FIG. 18 is a perspective view of a spherical bearing assembly according to one embodiment of the invention.

Although embodiments of the invention utilizing a strap clamp for compressing the housing around the core have been shown incorporating flat, belt-like straps, it will be appreciated that other strap-equivalent structures can also be used for effecting hoop compression around the housing, such as wires, chains, ropes, cables, high-tensile strength bands, and other circular linkages. For example, FIG. 18 depicts a bearing assembly 1600 of the invention having a spherical core 100 with high truncation of the type depicted in FIGS. 1 and 13. The housing base 1608 and housing cap 1609 of the bearing housing 1606 include a deep recess 1610 to accommodate a cable clamp 1607 having a cable 1612 and a cable tensioning mechanism 1613 to provide immobilizing hoop compression against the housing 1606 and core 100. The cable tensioning mechanism 1613 includes a cable tightening screw 1616 at the cable split 1614 to allow for tensioning of the cable clamp 1607 with resulting compression of the housing 1606. The housing base 1608 includes a mounting flange 1615 with mounting holes 1617 to allow for fixed engagement of the housing base 1608 to an external object and for relative immobilization of an object immobilized by the bearing assembly 1600.

Those skilled in the art will realize that this invention is capable of embodiments different from those shown and described. It will be appreciated that the detail of the structure of the disclosed apparatuses and methodologies can be changed in various ways without departing from the invention itself. Accordingly, the drawings and detailed description of the preferred embodiments are to be regarded as including such equivalents as do not depart from the spirit and scope of the invention.

The invention claimed is:

1. A method for releasably immobilizing an attachment to a shaft comprising:
   providing a truncated flexible spherical core for a spherical bearing;
   boring an annular hole through the center of the core;
   creating segments around the spherical core by making relief cuts in the core;
   arranging the relief cuts to provide deflection flexure points displaced from the annular hole in the core;
   providing a flexible housing surrounding the spherical core that comprises a clamping mechanism for compressing the housing and the spherical core;
   attaching an attachment to the housing;
   placing the shaft through the annular hole;
   compressing the spherical core with the clamping mechanism and housing to deflect the segments about the deflection flexure points toward the shaft to immobilize the core on the shaft, the housing on the core, and the attachment on the housing; and
   releasing the clamping mechanism to release the immobilization of the attachment when mobility of the attachment is desired.

2. The method of claim 1 further comprising holding the attachment in a desired position while compressing the clamping mechanism on the housing and core to releasably immobilize the attachment.

3. The method of claim 1 where the spherical core is not truncated.

4. The method of claim 1 further comprising disposing at least one relief cut through the spherical core passing between the annular hole and the outside of the core to increase the flexibility of the core when it is clamped by the housing.

5. The method of claim 4 further comprising disposing at least one relief cut through the side of the housing, the housing cut providing space to compress the housing and thus immobilize the bearing.

6. The method of claim 5 where the operation of the bearing does not depend on alignment of the cuts passing through the core and through the housing.

7. The method of claim 1 further comprising using a round shaft.

8. The method of claim 1 further comprising using a shaft that is not round.

9. The method of claim 1 where the attachment is attached to the clamping mechanism.

10. A spherical bearing for releasably immobilizing an attachment to an external object, said bearing comprising:
    a spherical core having a top, a bottom, a center, a spherical outer periphery, and an annular hole through said center of said core for appending said core to the external object, the spherical core further comprising:
       said annular hole extending from said top to said bottom of said spherical core, said spherical outer periphery extending to said annular hole, and a plurality of segments positioned radially around said annular hole, said segments being defined by at least one of a plurality of outer relief cuts formed in said spherical outer periphery and a plurality of inner relief cuts formed around said annular hole; and
       a plurality of deflection flexure points, each said point formed at at least one of an inner end of one said outer relief cut and an outer end of one said inner relief cut in said core;
    a flexible housing surrounding said spherical core;
    a releasable clamping mechanism for radially clamping said flexible housing to compress said spherical core, said clamping mechanism being positioned to reduce the diameter of said flexible housing when said clamping mechanism is tightened to cause said segments to deflect about said deflection flexure points and conform to the outer surface of the external object, thereby immobilizing said core on the external object and immobilizing said housing on said core; and
    said spherical core having a spherical core diameter and the external object having an object diameter wherein the ratio of said spherical core diameter to said object diameter is greater than about 1.5.

11. The spherical bearing of claim 10 wherein at least one of said plurality of outer relief cuts and said plurality of inner relief cuts extends from said top to said bottom of said spherical core.

12. The spherical bearing of claim 10 wherein the bearing is shaped to engage and conform to an external object that is a shaft.

13. The spherical bearing of claim 10 wherein the attachment is mounted on said spherical bearing.

14. The spherical bearing of claim 13 wherein the attachment can be positioned by holding the attachment in the desired position and can be immobilized by tightening a single clamp on said housing.

15. The spherical bearing of claim 10 wherein a relief cut splits said spherical core between said annular hole and said spherical outer periphery of said core to increase the flexibility of said core when it is compressed by said housing.

16. The spherical bearing of claim 15 wherein at least one relief cut splits a side of said housing, said at least one relief cut providing space to compress said housing and immobilize said bearing.

17. The spherical bearing of claim 16 wherein said bearing is positioned to engage an external object that is a shaft with said spherical core such that said bearing, when in engagement with the shaft, can immobilize the shaft at different positioned alignments of said relief cuts passing through said core, the different positioned alignments being relative to said housing.

18. The spherical bearing of claim 10 wherein said flexure points are displaced from said annular hole such that pressure applied by said housing on said segments causes the segments to deflect toward the external object to provide uniform contact of said segments with the external object.

19. The spherical bearing of claim 10 wherein said core and said housing are modified with relief cuts to maximize immobility when said bearing is clamped on an external object that is a shaft regardless of the orientation of core relief cuts relative to housing relief cuts.

20. The spherical bearing of claim 10 wherein said annular hole of said spherical core is shaped to engage and conform to an external object that is a shaft and that is round.

21. The spherical bearing of claim 10 wherein said annular hole of said spherical core is shaped to engage and conform to an external object that is a shaft and that is not round.

22. The spherical bearing of claim 10 further comprising a two-piece flexible housing and a strap clamp, said strap clamp allowing for compression of said two piece flexible housing to compress said spherical core and immobilize an external object.

23. A spherical bearing for releasably immobilizing an attachment to an external object, said bearing comprising:
  a truncated spherical core having opposing top and bottom surfaces connected by a spherical outer periphery, and further comprising an annular hole through the center of said core for appending said core to the external object, the core further comprising:
    a plurality of segments positioned radially around said annular hole, said segments being defined by a plurality of outer relief cuts formed in said spherical outer periphery and around said annular hole; and
    a plurality of deflection flexure points, each said point formed at an inner end of one said outer relief cut in said core;
  a flexible housing surrounding said spherical core;
  a releasable clamping mechanism for radially clamping said flexible housing to compress said spherical core, said clamping mechanism being positioned to reduce the diameter of said flexible housing when said clamping mechanism is tightened to cause said segments to deflect about said deflection flexure points and conform to the outer surface of the external object, thereby immobilizing said core on the external object and immobilizing said housing on said core; and
  said spherical core having a spherical core diameter and the external object having an object diameter wherein the ratio of said spherical core diameter to said object diameter is greater than about 1.5.

24. The spherical bearing of claim 23 wherein at least one said outer relief cut extends from said top surface to said bottom surface of said spherical core.

25. The spherical bearing of claim 23 wherein said plurality of outer relief cuts extend from said top to said bottom of said spherical core.

26. The spherical bearing of claim 23 wherein the bearing is shaped to engage and conform to an external object that is a shaft.

27. The spherical bearing of claim 23 wherein the attachment is mounted on said spherical bearing.

28. The spherical bearing of claim 27 wherein the attachment can be positioned by holding the attachment in the desired position and can be immobilized by tightening a single clamp on said housing.

29. The spherical bearing of claim 23 wherein a relief cut splits said spherical core between said annular hole and said spherical outer periphery of said core to increase the flexibility of said core when it is compressed by said housing.

30. The spherical bearing of claim 29 wherein at least one relief cut splits a side of said housing, said at least one relief cut providing space to compress said housing and immobilize said bearing.

31. The spherical bearing of claim 30 wherein said bearing is positioned to engage an external object that is a shaft with said spherical core such that said bearing, when in engagement with the shaft, can immobilize the shaft at different positioned alignments of said relief cuts passing through said core, the different positioned alignments being relative to said housing.

32. The spherical bearing of claim 23 wherein said flexure points are displaced from said annular hole such that pressure applied by said housing on said segments causes the segments to deflect toward the external object to provide uniform contact of said segments with the external object.

33. The spherical bearing of claim 23 wherein said core and said housing are modified with relief cuts to maximize immobility when said bearing is clamped on an external object that is a shaft regardless of the orientation of core relief cuts relative to housing relief cuts.

34. The spherical bearing of claim 23 wherein said annular hole of said spherical core is shaped to engage and conform to an external object that is a shaft and that is round.

35. The spherical bearing of claim 23 wherein said annular hole of said spherical core is shaped to engage and conform to an external object that is a shaft and that is not round.

36. The spherical bearing of claim 23 further comprising a two-piece flexible housing and a strap clamp, said strap clamp allowing for compression of said two piece flexible housing to compress said spherical core and immobilize an external object.

37. A spherical bearing for releasably immobilizing an attachment to an external object, said bearing comprising:
  a truncated spherical core having opposing top and bottom surfaces connected by a spherical outer periphery, and further comprising an annular hole through the center of said core for appending said core to the external object, the core further comprising:
    a plurality of segments positioned radially around said annular hole, said segments being defined by a plurality of inner relief cuts formed around said annular hole; and
    a plurality of deflection flexure points, each said point formed at an outer end of one said inner relief cut in said core;
  a flexible housing surrounding said spherical core;
  a releasable clamping mechanism for radially clamping said flexible housing to compress said spherical core, said clamping mechanism being positioned to reduce the diameter of said flexible housing when said clamping mechanism is tightened to cause said segments to deflect about said deflection flexure points and conform to the outer surface of the external object, thereby immobilizing said core on the external object and immobilizing said housing on said core; and
  said spherical core having a spherical core diameter and the external object having an object diameter wherein the ratio of said spherical core diameter to said object diameter is greater than about 1.5.

38. The spherical bearing of claim 37 wherein at least one said inner relief cut extends from said top surface to said bottom surface of said spherical core.

39. The spherical bearing of claim 37 wherein said plurality of inner relief cuts extends from said top to said bottom of said spherical core.

40. The spherical bearing of claim 37 wherein the bearing is shaped to engage and conform to an external object that is a shaft.

41. The spherical bearing of claim 37 wherein the attachment is mounted on said spherical bearing.

42. The spherical bearing of claim 41 wherein the attachment can be positioned by holding the attachment in the desired position and can be immobilized by tightening a single clamp on said housing.

43. The spherical bearing of claim 37 wherein a relief cut splits said spherical core between said annular hole and said spherical outer periphery of said core to increase the flexibility of said core when it is compressed by said housing.

44. The spherical bearing of claim 43 wherein at least one relief cut splits a side of said housing, said at least one relief cut providing space to compress said housing and immobilize said bearing.

45. The spherical bearing of claim 44 wherein said bearing is positioned to engage an external object that is a shaft with said spherical core such that said bearing, when in engagement with the shaft, can immobilize the shaft at different positioned alignments of said relief cuts passing through said core, the different positioned alignments being relative to said housing.

46. The spherical bearing of claim 37 wherein said flexure points are displaced from said annular hole such that pressure applied by said housing on said segments causes the segments to deflect toward the external object to provide uniform contact of said segments with the external object.

47. The spherical bearing of claim 37 wherein said core and said housing are modified with relief cuts to maximize immobility when said bearing is clamped on an external object that is a shaft regardless of the orientation of core relief cuts relative to housing relief cuts.

48. The spherical bearing of claim 37 wherein said annular hole of said spherical core is shaped to engage and conform to an external object that is a shaft and that is round.

49. The spherical bearing of claim 37 wherein said annular hole of said spherical core is shaped to engage and conform to an external object that is a shaft and that is not round.

50. The spherical bearing of claim 37 further comprising a two-piece flexible housing and a strap clamp, said strap clamp allowing for compression of said two piece flexible housing to compress said spherical core and immobilize an external object.

51. A spherical bearing for releasably immobilizing an attachment to an external object, said bearing comprising:
    a spherical core having a top, a bottom, a center, a spherical outer periphery, and an annular hole through said center of said core for appending said core to the external object, the spherical core further comprising:
        said annular hole extending from said top to said bottom of said spherical core, said spherical outer periphery extending to said annular hole, and a plurality of segments positioned radially around said annular hole, said segments being defined by at least one of a plurality of outer relief cuts formed in said spherical outer periphery and around said annular hole; and
        a plurality of deflection flexure points, each said point formed at an inner end of one said outer relief cut in said core;
    a flexible housing surrounding said spherical core;
    a releasable clamping mechanism for radially clamping said flexible housing to compress said spherical core, said clamping mechanism being positioned to reduce the diameter of said flexible housing when said clamping mechanism is tightened to cause said segments to deflect about said deflection flexure points and conform to the outer surface of the external object, thereby immobilizing said core on the external object and immobilizing said housing on said core; and
    said spherical core having a spherical core diameter and the external object having an object diameter wherein the ratio of said spherical core diameter to said object diameter is greater than about 1.5.

52. The spherical bearing of claim 51 wherein at least one said outer relief cut extends from said top to said bottom of said spherical core.

53. The spherical bearing of claim 51 wherein said plurality of outer relief cuts extends from said top to said bottom of said spherical core.

54. The spherical bearing of claim 51 wherein the bearing is shaped to engage and conform to an external object that is a shaft.

55. The spherical bearing of claim 51 wherein the attachment is mounted on said spherical bearing.

56. The spherical bearing of claim 55 wherein the attachment can be positioned by holding the attachment in the desired position and can be immobilized by tightening a single clamp on said housing.

57. The spherical bearing of claim 51 wherein a relief cut splits said spherical core between said annular hole and said spherical outer periphery of said core to increase the flexibility of said core when it is compressed by said housing.

58. The spherical bearing of claim 57 wherein at least one relief cut splits a side of said housing, said at least one relief cut providing space to compress said housing and immobilize said bearing.

59. The spherical bearing of claim 58 wherein said bearing is positioned to engage an external object that is a shaft with said spherical core such that said bearing, when in engagement with the shaft, can immobilize the shaft at different positioned alignments of said relief cuts passing through said core, the different positioned alignments being relative to said housing.

60. The spherical bearing of claim 51 wherein said flexure points are displaced from said annular hole such that pressure applied by said housing on said segments causes the segments to deflect toward the external object to provide uniform contact of said segments with the external object.

61. The spherical bearing of claim 51 wherein said core and said housing are modified with relief cuts to maximize immobility when said bearing is clamped on an external object that is a shaft regardless of the orientation of core relief cuts relative to housing relief cuts.

62. The spherical bearing of claim 51 wherein said annular hole of said spherical core is shaped to engage and conform to an external object that is a shaft and that is round.

63. The spherical bearing of claim 51 wherein said annular hole of said spherical core is shaped to engage and conform to an external object that is a shaft and that is not round.

64. The spherical bearing of claim 51 further comprising a two-piece flexible housing and a strap clamp, said strap clamp allowing for compression of said two piece flexible housing to compress said spherical core and immobilize an external object.

65. A spherical bearing for releasably immobilizing an attachment to an external object, said bearing comprising:
    a spherical core having a top, a bottom, a center, a spherical outer periphery, and an annular hole through said center of said core for appending said core to the external object, the spherical core further comprising:
        said annular hole extending from said top to said bottom of said spherical core, said spherical outer periphery extending to said annular hole, and a plurality of segments positioned radially around said annular hole, said segments being defined by a plurality of inner relief cuts formed around said annular hole; and a plurality of deflection flexure points, each said point formed at an outer end of one said inner relief cut in said core;

a flexible housing surrounding said spherical core;

a releasable clamping mechanism for radially clamping said flexible housing to compress said spherical core, said clamping mechanism being positioned to reduce the diameter of said flexible housing when said clamping mechanism is tightened to cause said segments to deflect about said deflection flexure points and conform to the outer surface of the external object, thereby immobilizing said core on the external object and immobilizing said housing on said core; and said spherical core having a spherical core diameter and the external object having an object diameter wherein the ratio of said spherical core diameter to said object diameter is greater than about 1.5.

66. The spherical bearing of claim 65 wherein at least one said inner relief cuts extends from said top to said bottom of said spherical core.

67. The spherical bearing of claim 65 wherein said plurality of inner relief cuts extends from said top to said bottom of said spherical core.

68. The spherical bearing of claim 65 wherein the bearing is shaped to engage and conform to an external object that is a shaft.

69. The spherical bearing of claim 65 wherein the attachment is mounted on said spherical bearing.

70. The spherical bearing of claim 69 wherein the attachment can be positioned by holding the attachment in the desired position and can be immobilized by tightening a single clamp on said housing.

71. The spherical bearing of claim 65 wherein a relief cut splits said spherical core between said annular hole and said spherical outer periphery of said core to increase the flexibility of said core when it is compressed by said housing.

72. The spherical bearing of claim 71 wherein at least one relief cut splits a side of said housing, said at least one relief cut providing space to compress said housing and immobilize said bearing.

73. The spherical bearing of claim 72 wherein said bearing is positioned to engage an external object that is a shaft with said spherical core such that said bearing, when in engagement with the shaft, can immobilize the shaft at different positioned alignments of said relief cuts passing through said core, the different positioned alignments being relative to said housing.

74. The spherical bearing of claim 65 wherein said flexure points are displaced from said annular hole such that pressure applied by said housing on said segments causes the segments to deflect toward the external object to provide uniform contact of said segments with the external object.

75. The spherical bearing of claim 65 wherein said core and said housing are modified with relief cuts to maximize immobility when said bearing is clamped on an external object that is a shaft regardless of the orientation of core relief cuts relative to housing relief cuts.

76. The spherical bearing of claim 65 wherein said annular hole of said spherical core is shaped to engage and conform to an external object that is a shaft and that is round.

77. The spherical bearing of claim 65 wherein said annular hole of said spherical core is shaped to engage and conform to an external object that is a shaft and that is not round.

78. The spherical bearing of claim 65 further comprising a two-piece flexible housing and a strap clamp, said strap clamp allowing for compression of said two piece flexible housing to compress said spherical core and immobilize an external object.

79. A spherical bearing for releasably immobilizing an attachment to an external object, said bearing comprising:

a spherical core having a spherical outer periphery and an annular hole through said center of said core for appending said core to the external object, the spherical core further comprising:

said annular hole extending from said top to said bottom of said spherical core, said spherical outer periphery extending to said annular hole, and a plurality of segments positioned radially around said annular hole, said segments being defined by at least one of a plurality of relief cuts formed around said annular hole; and a plurality of deflection flexure points, each said point formed at an end of one said relief cut in said core;

a housing surrounding said spherical core;

a releasable strap clamp, said strap clamp comprising:

a circumferential strap, said strap extending around the circumference of said housing; and a strap tightener, said strap tightener positioned to reduce the diameter of said circumferential strap to exert hoop compression around said housing to compress said spherical core and reduce the diameter of said flexible housing when said clamping mechanism is tightened to cause said segments to deflect about said deflection flexure points and conform to the outer surface of the external object, thereby immobilizing said core on the external object and immobilizing said housing on said core; and said spherical core having a spherical core diameter and the external object having an object diameter wherein the ratio of said spherical core diameter to said object diameter is greater than about 1.5.

80. The spherical bearing of claim 79 further comprising a two-piece housing having a housing base and a housing cap, said base and said cap being separated by a housing split therebetween when said housing is compressed by said strap clamp.

81. The spherical bearing of claim 80 wherein said strap of said strap clamp is at least one of a belt strap, a chain, a wire, a cable, a hose clamp, a rope, and a high-tensile strength band.

82. The spherical bearing of claim 79 further comprising:

a two-piece housing having a housing base and a housing cap, said base and said cap being separated by a housing split therebetween when said housing is compressed by said strap clamp; and said housing base and said housing clamp having a recess for positioning said strap clamp when said housing is compressed by said strap clamp.

83. The spherical bearing of claim 79 wherein said strap tightener is at least one of a t-bolt, a tightening screw, a cable tensioning mechanism, a tightening nob, and a gear.

84. A spherical bearing for releasably immobilizing an attachment to an external object, said bearing comprising:

a spherical core having a spherical outer periphery and an annular hole through said center of said core for appending said core to the external object, the spherical core further comprising:
   said annular hole extending from said top to said bottom of said spherical core, said spherical outer periphery extending to said annular hole, and a plurality of segments positioned radially around said annular hole, said segments being defined by at least one of a plurality of relief cuts formed around said annular hole, said relief cuts being at least one of inside cuts located adjacent said annular hole and outside cuts located along said spherical outer periphery of said core; and
   a plurality of deflection flexure points, each said point formed at an end of one said relief cut in said core;
a two-piece housing surrounding said spherical core, said housing having a housing base and a housing cap, said base and said cap being separated by a housing split therebetween when said housing is compressed by said strap clamp;
a releasable strap clamp, said strap clamp comprising:
   a circumferential strap, said strap extending around the circumference of said housing; and
   a strap tightener, said strap tightener positioned to reduce the diameter of said circumferential strap to exert hoop compression around said housing to compress said spherical core and reduce the diameter of said flexible housing when said clamping mechanism is tightened to cause said segments to deflect about said deflection flexure points and conform to the outer surface of the external object, thereby immobilizing said core on the external object and immobilizing said housing on said core; and
said spherical core having a spherical core diameter and the external object having an object diameter wherein the ratio of said spherical core diameter to said object diameter is greater than about 1.5.

85. The spherical bearing of claim 84 wherein said housing base and said housing clamp have a recess for positioning said strap clamp when said housing is compressed by said strap clamp.

86. The spherical bearing of claim 84 wherein said strap tightener is at least one of a t-bolt, a tightening screw, a cable tensioning mechanism, a tightening nob, and a gear.

87. The spherical bearing of claim 84 wherein said strap of said strap clamp is at least one of a belt strap, a chain, a wire, a cable, a hose clamp, a rope, and a high-tensile strength band.

* * * * *